United States Patent [19]

Brenneman

[11] 4,084,406
[45] Apr. 18, 1978

[54] CHILLER CONTROLS

[75] Inventor: Daniel A. Brenneman, Kettering, Ohio

[73] Assignee: Fedders Corporation, Edison, N.J.

[21] Appl. No.: 651,386

[22] Filed: Jan. 22, 1976

[51] Int. Cl.² .................... H02P 1/26; F25B 49/00
[52] U.S. Cl. ........................ 62/211; 307/252 Q; 318/227; 361/22; 361/92
[58] Field of Search .................. 318/227, 230, 416; 62/228, DIG. 9, 211, 213; 361/22 X, 92 X; 307/252 Q

[56] References Cited
U.S. PATENT DOCUMENTS

| 3,818,983 | 6/1974 | Grandia | 317/100 X |
| 3,959,704 | 5/1976 | McCrea | 317/13 A |
| 3,996,499 | 12/1976 | Gary et al. | 317/13 A |

OTHER PUBLICATIONS

Industrial Electronics Handbook, McGraw-Hill, 1960, pp. 2-2-236.

Primary Examiner—William E. Wayner
Attorney, Agent, or Firm—McAulay, Fields, Fisher & Goldstein

[57] ABSTRACT

A solid state starter for a chiller compressor motor mounts directly on the compressor motor and comprises a bank of SCR's which are controllably switched to conduct current to the motor for starting and running. Electronic control modules are provided including a trigger module for triggering the SCR's, a current module (including current overload protection) for controlling the trigger module so that motor current is controllably delivered to the motor, and a voltage safety module for protecting against electrical faults. The SCR's are cooled by liquid refrigerant.

10 Claims, 22 Drawing Figures

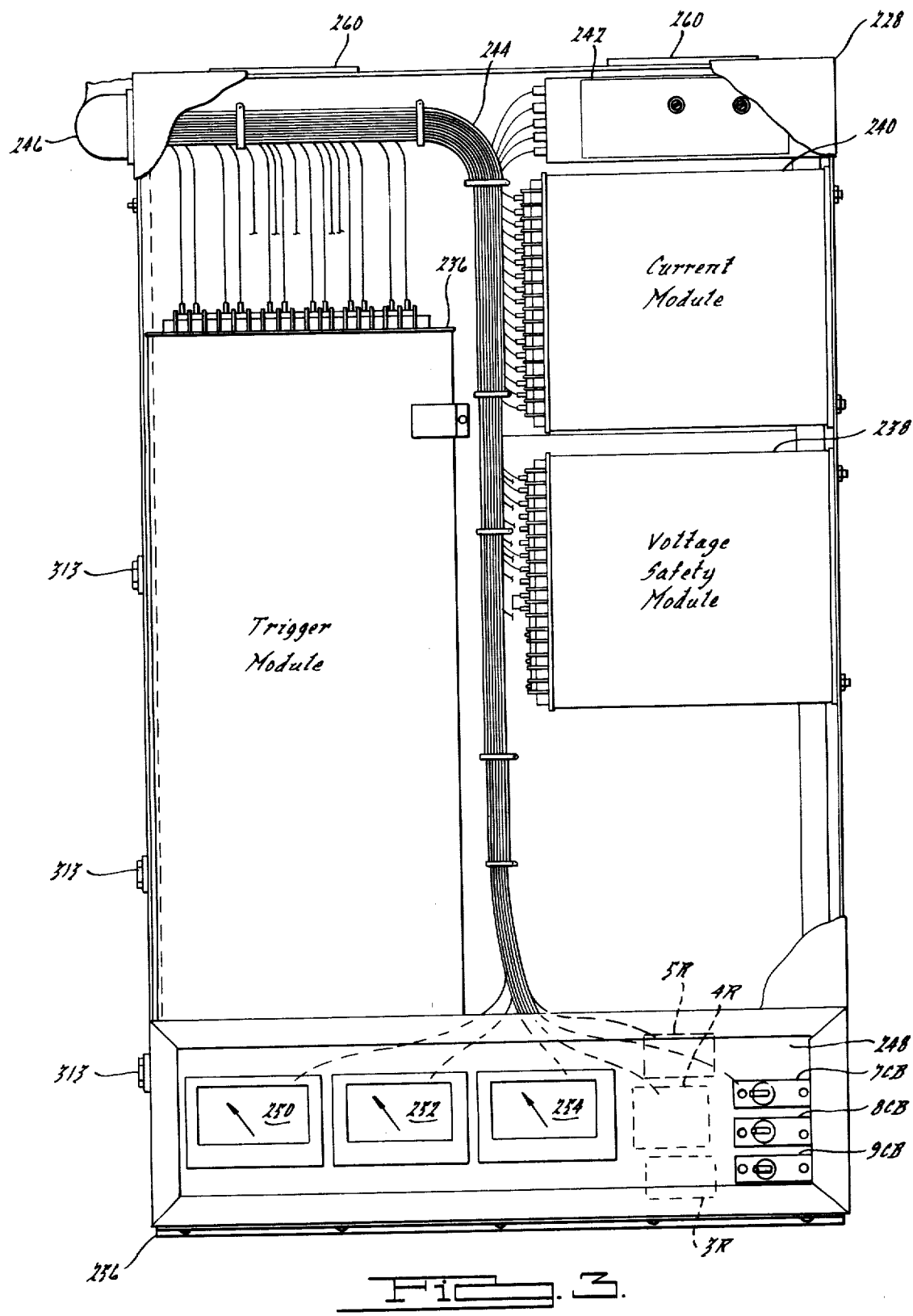

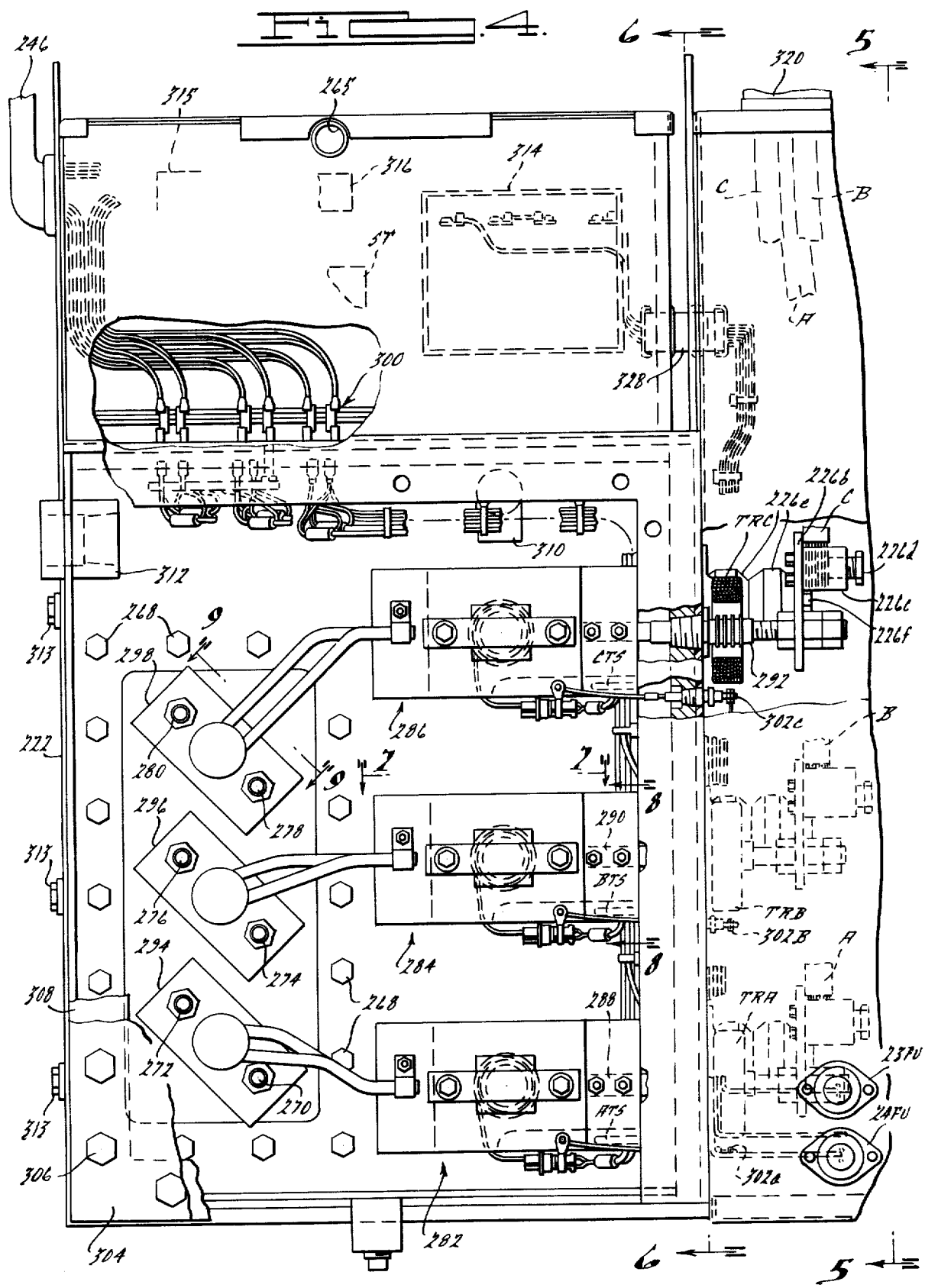

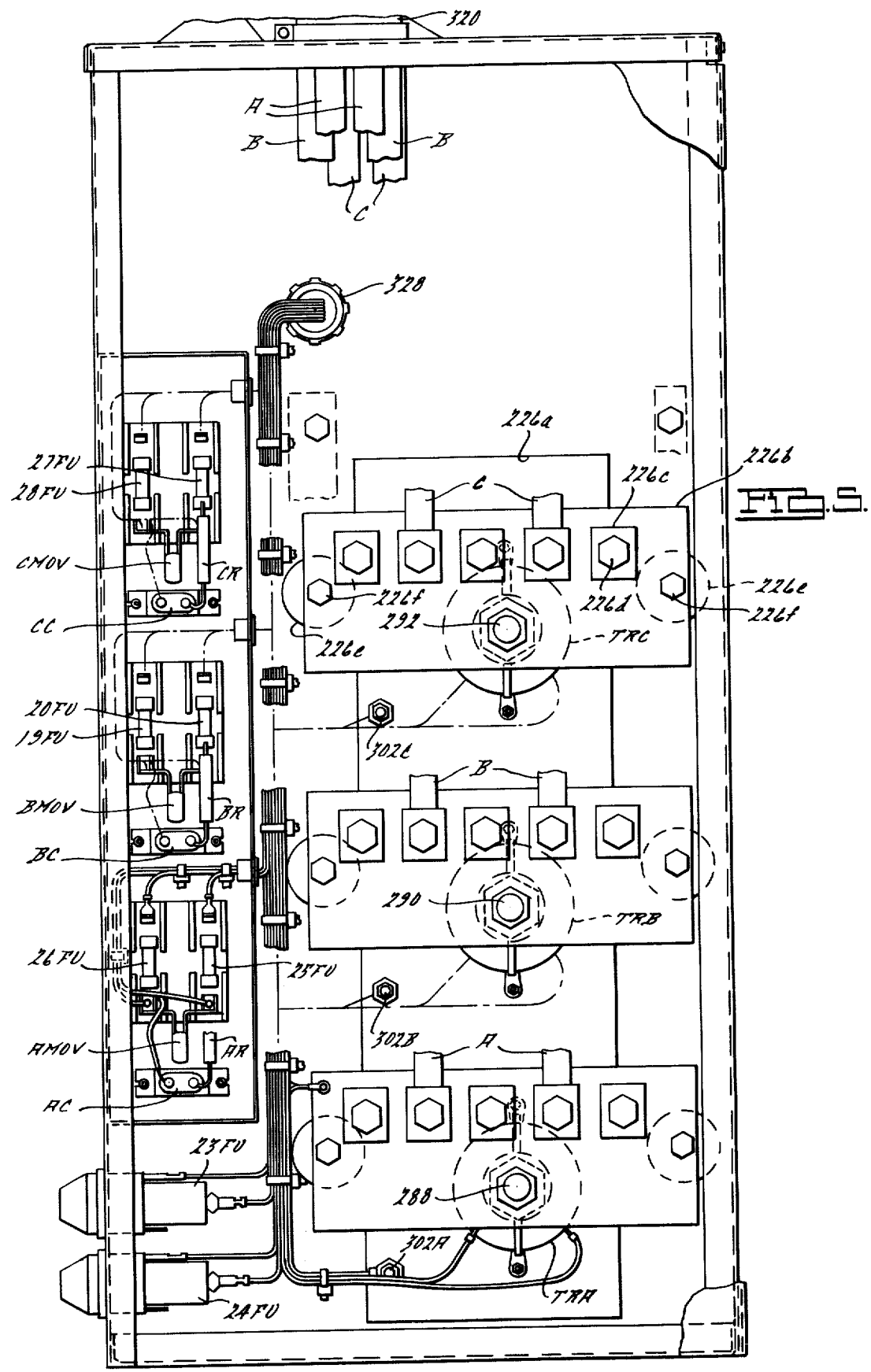

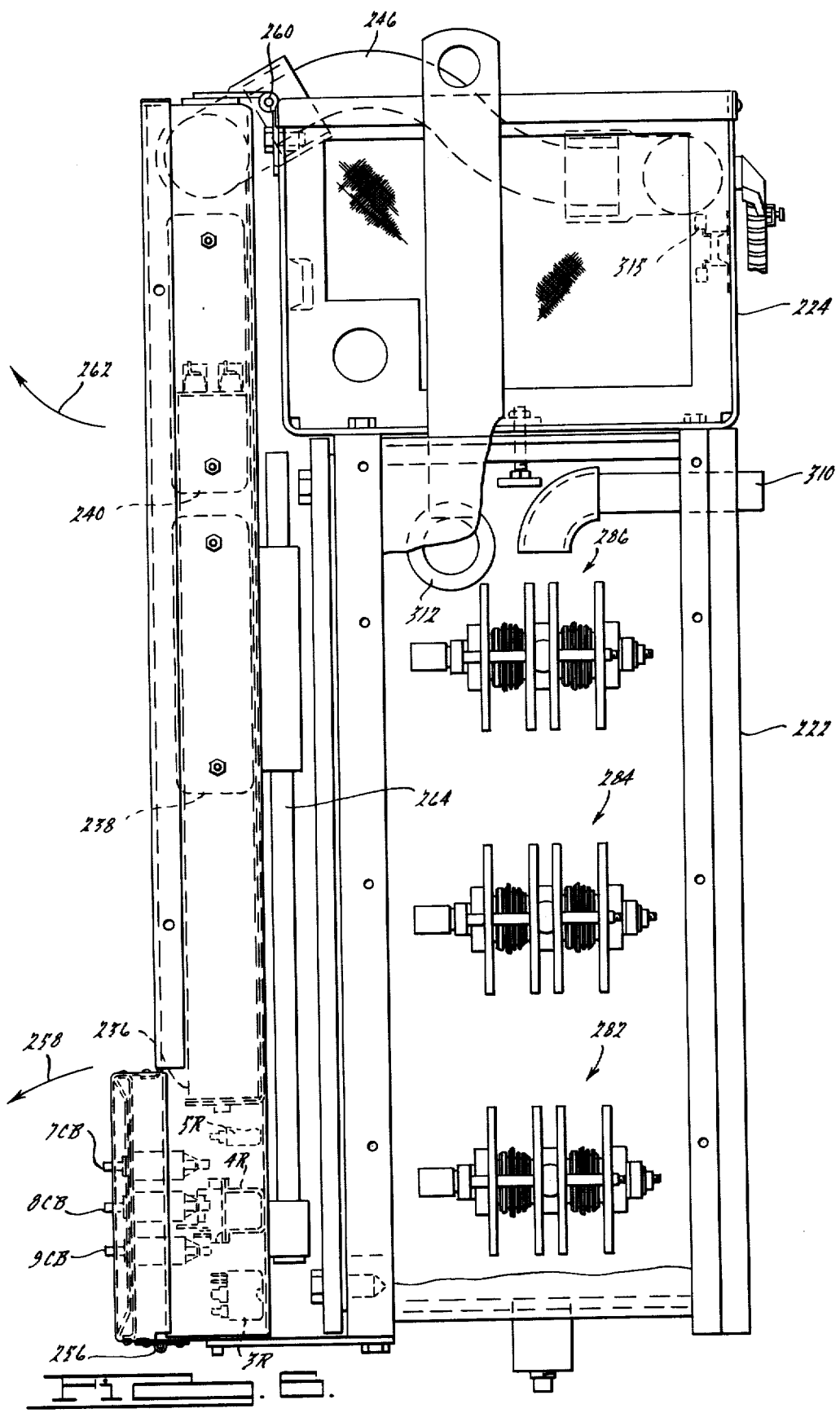

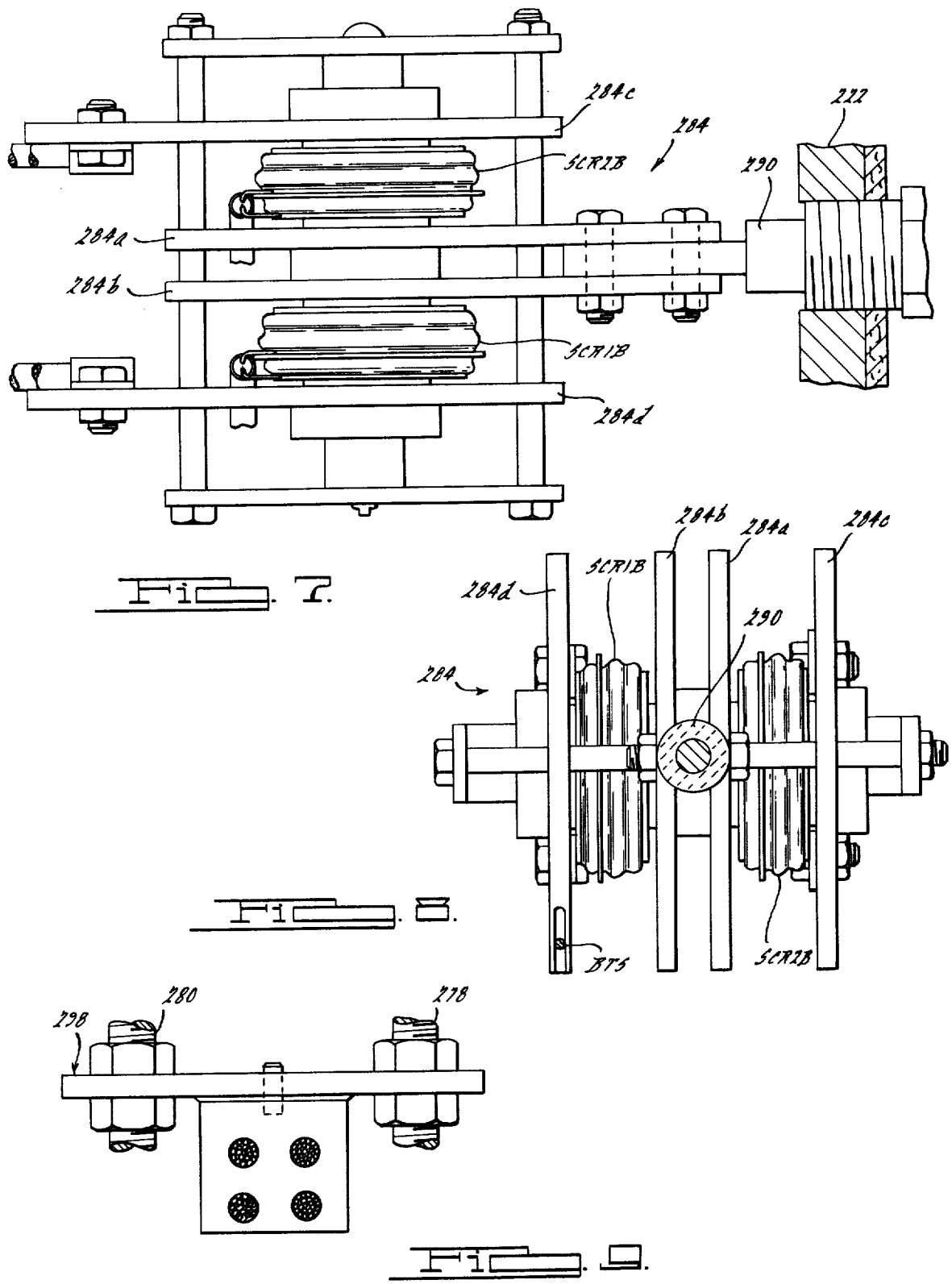

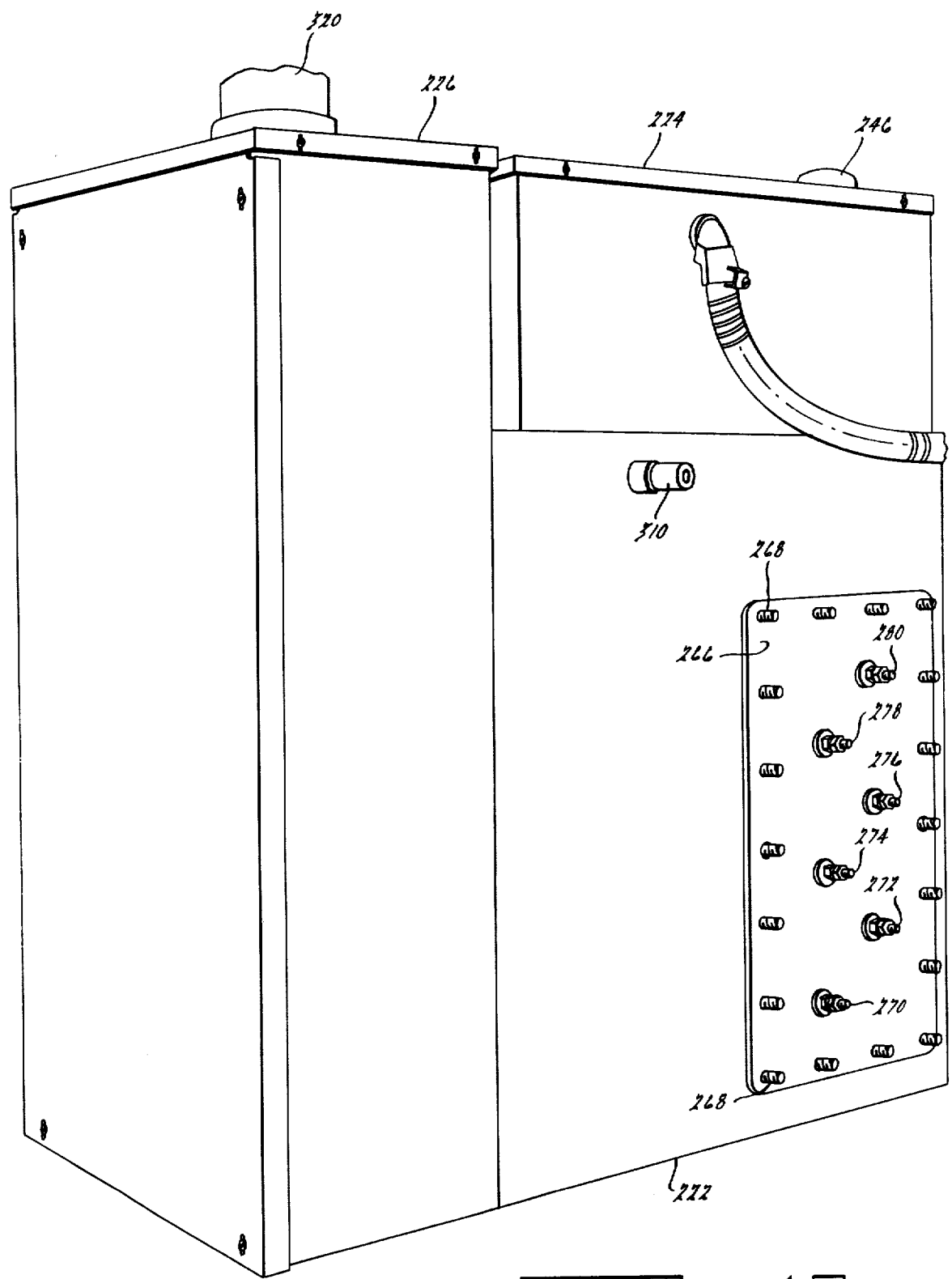

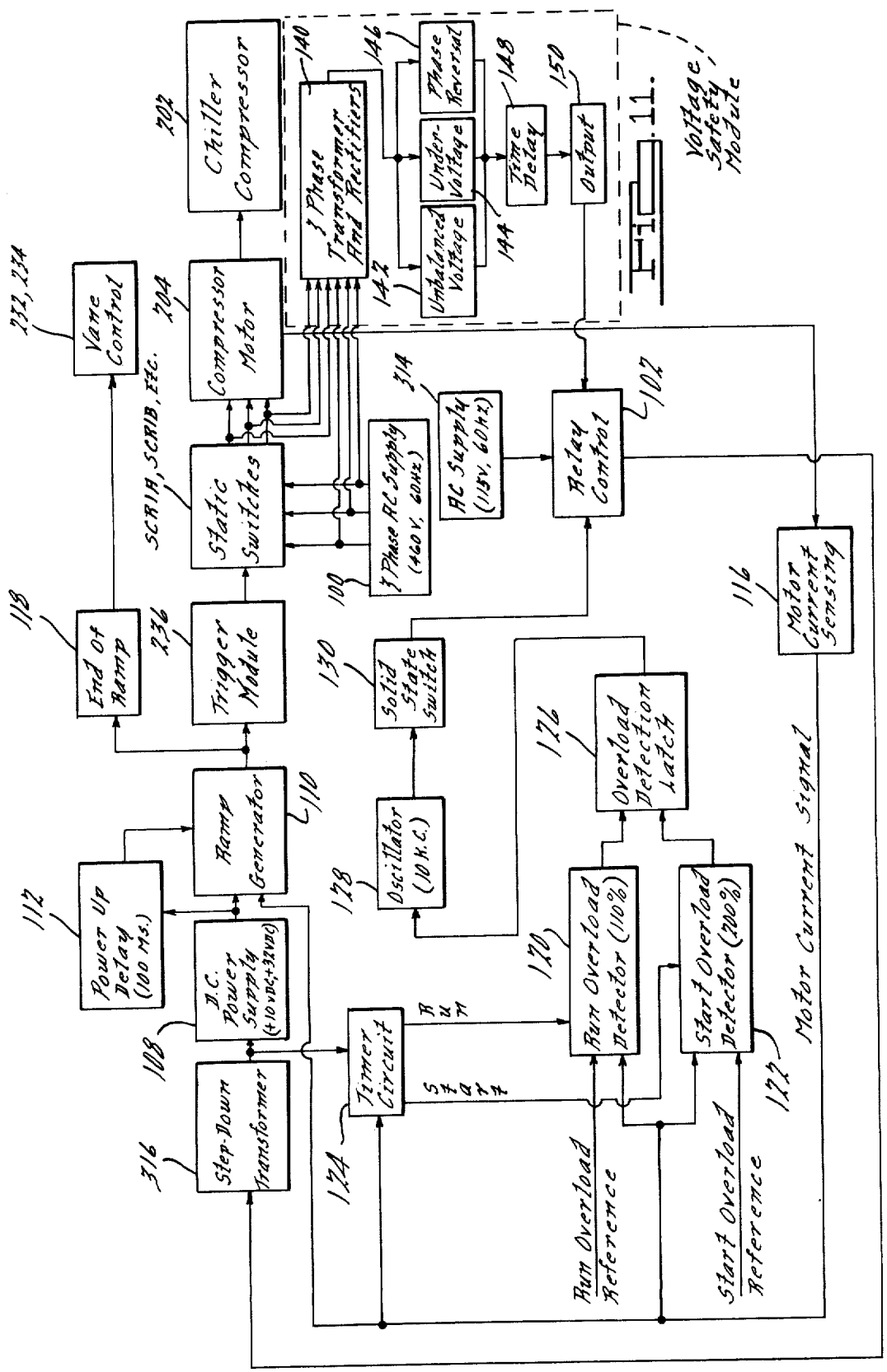

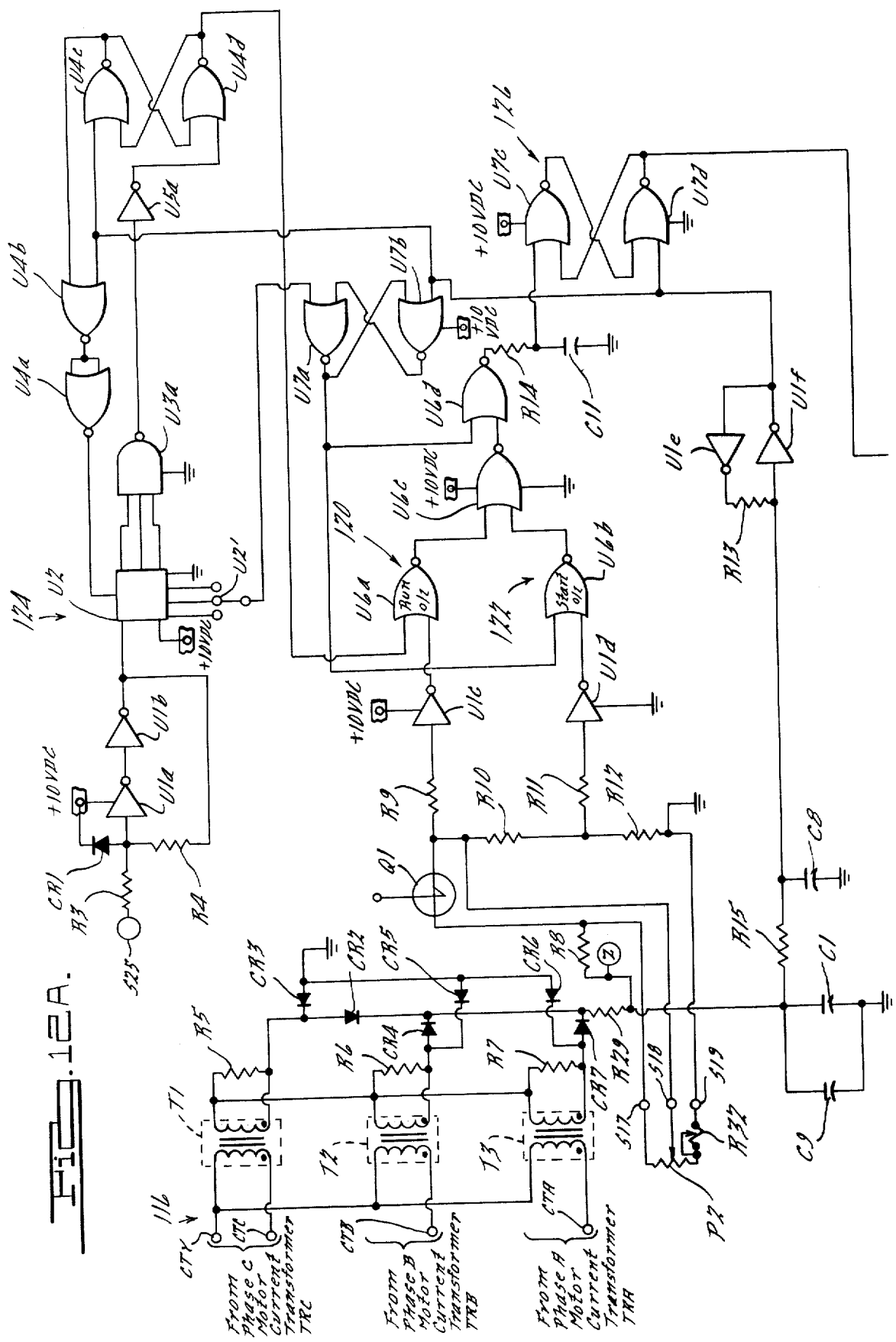

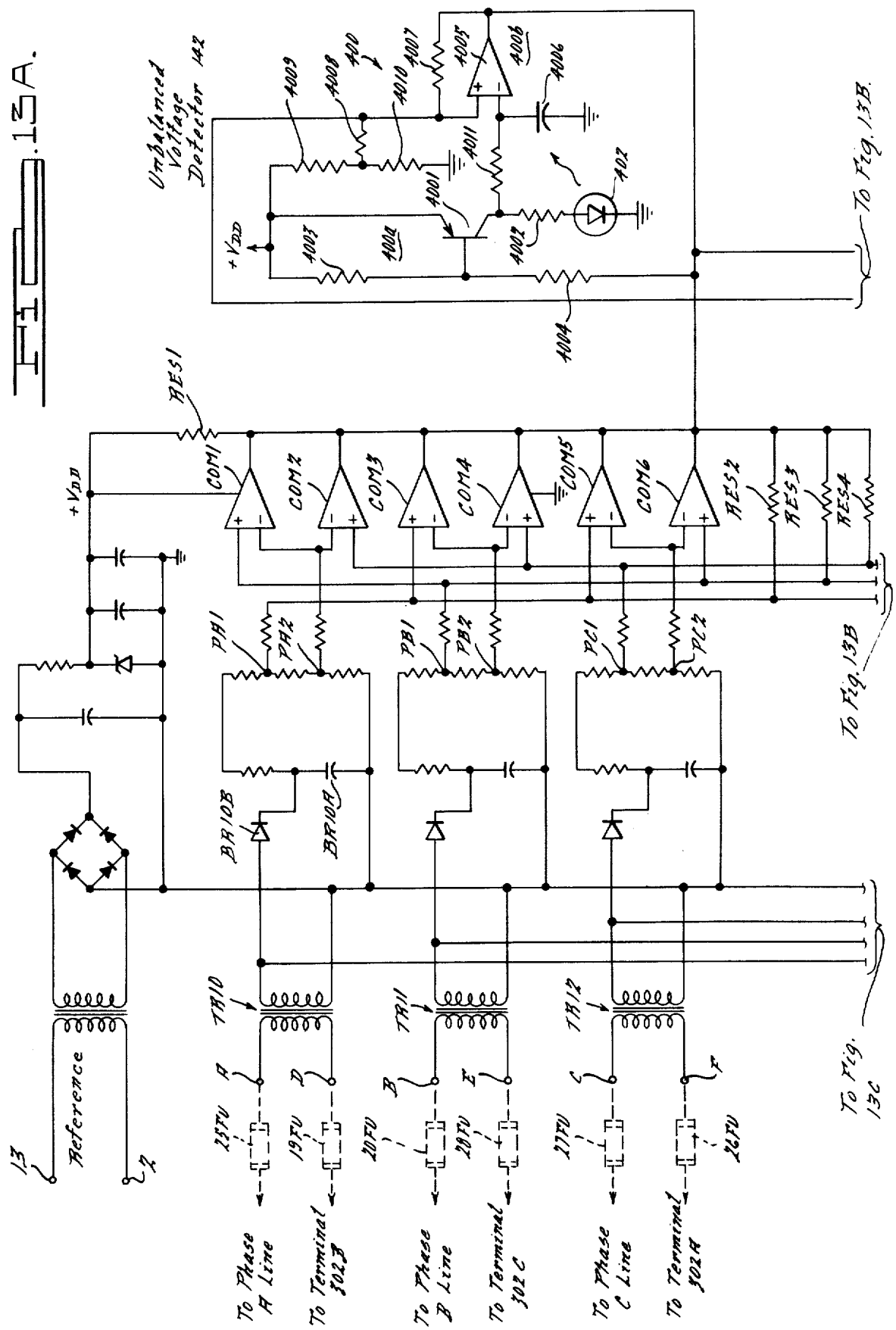

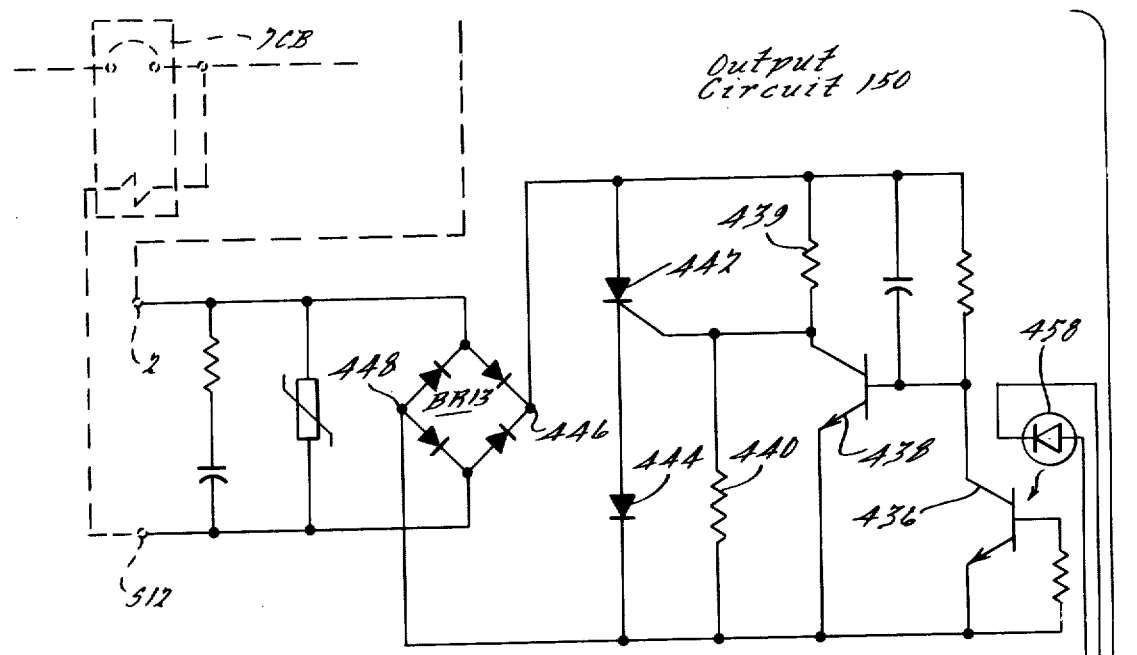
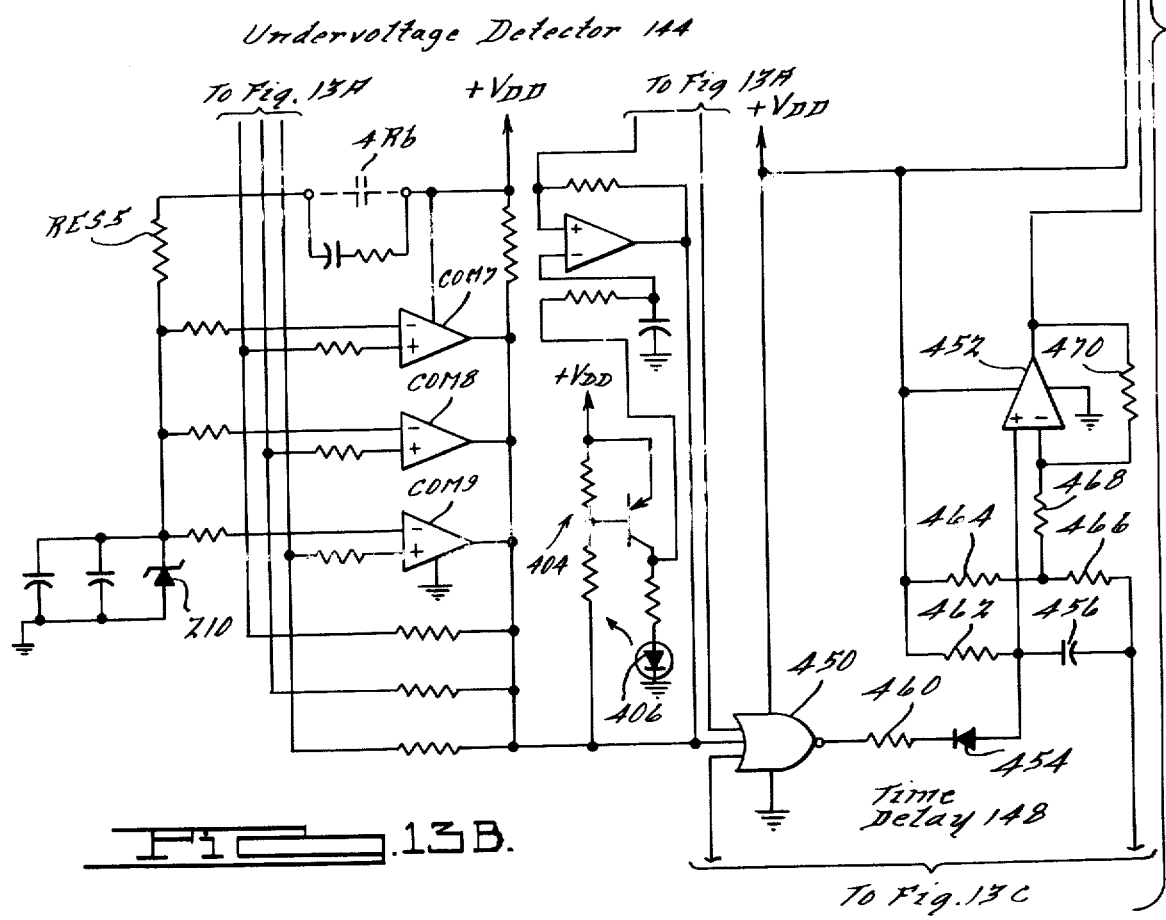
FIG. 13B.

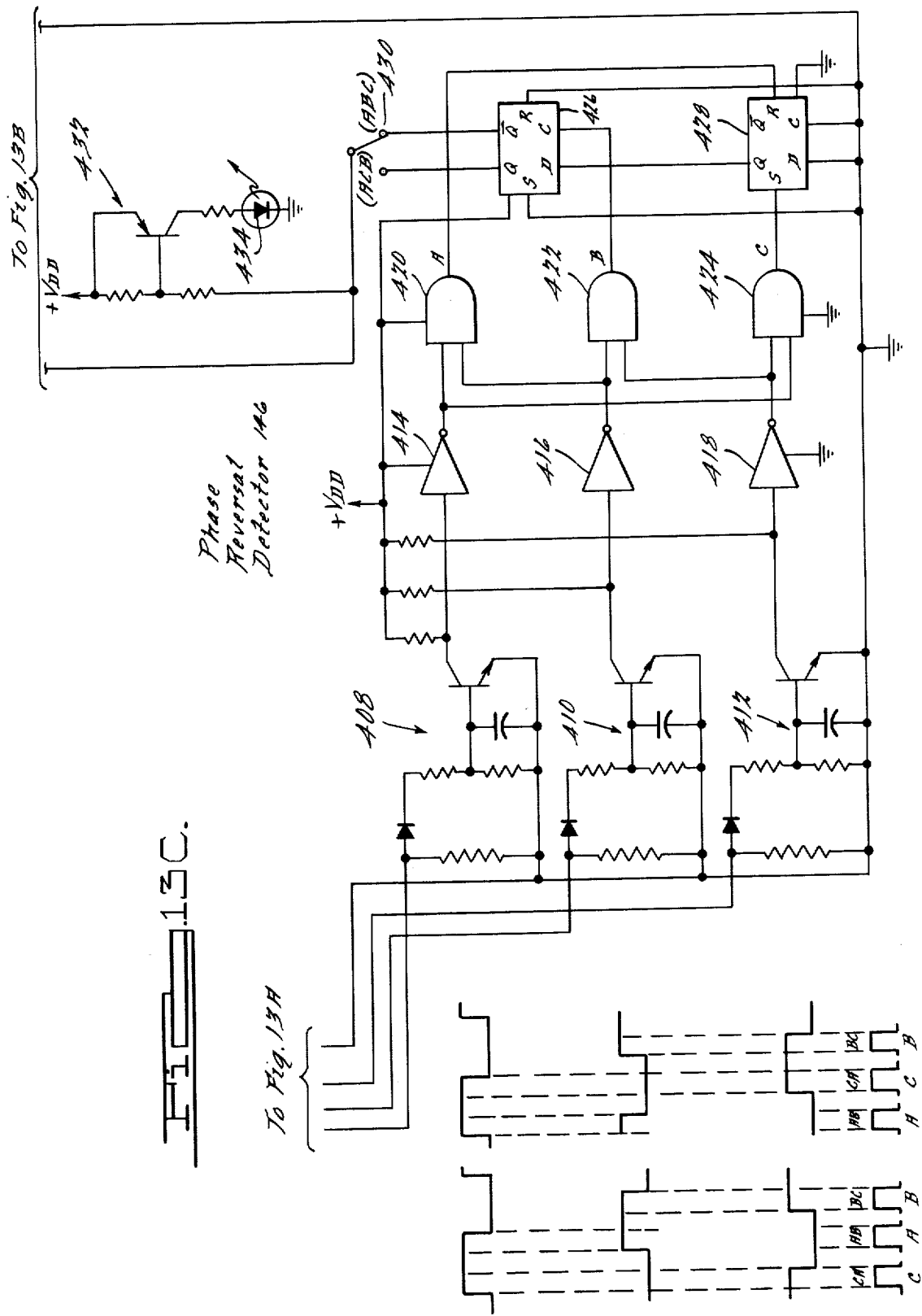

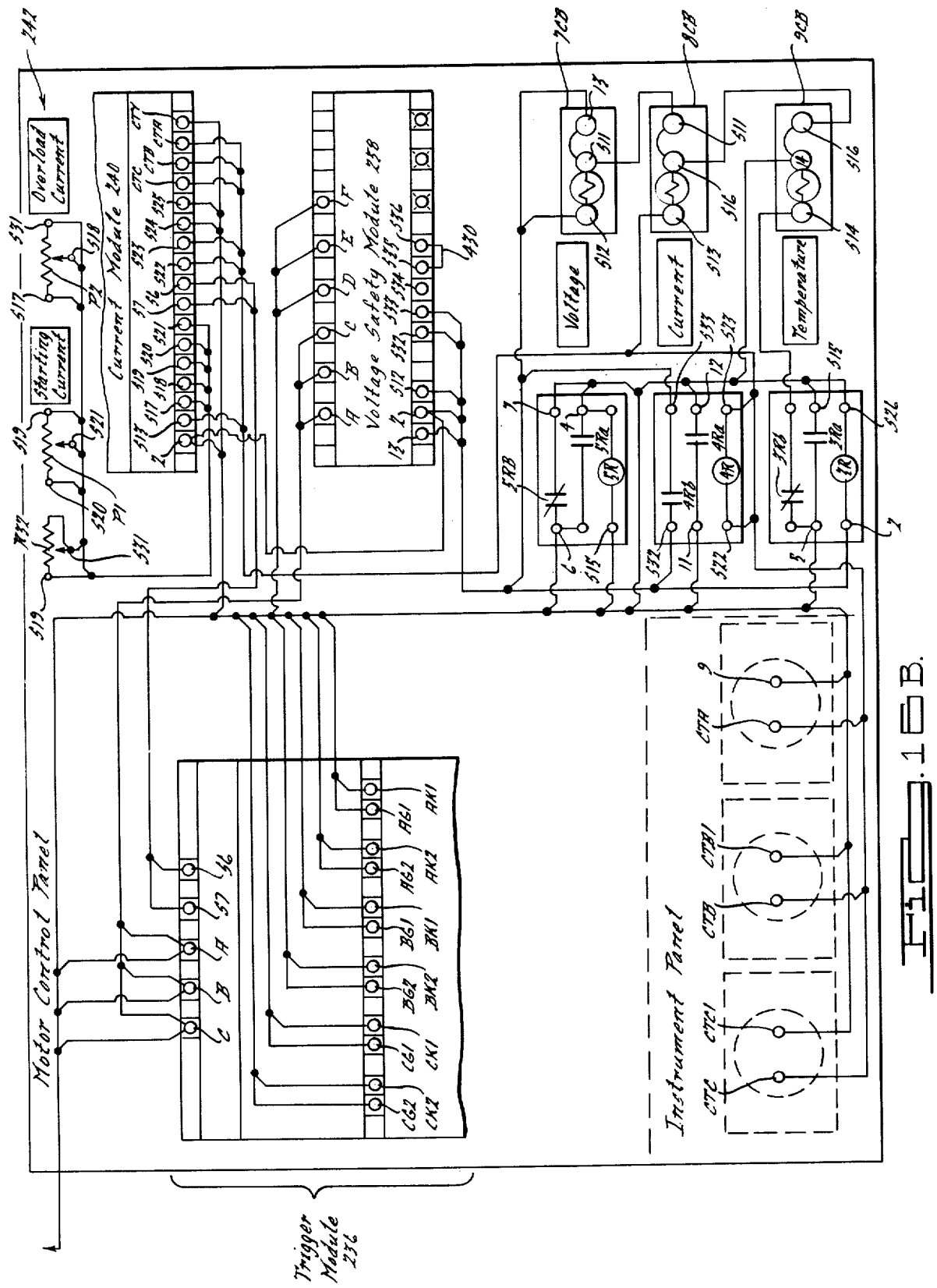

CHILLER CONTROLS

BACKGROUND AND SUMMARY OF THE INVENTION

This invention relates to chilling equipment and in particular to improvements in controls for chilling equipment.

A typical large modern office building is commonly air conditioned by circulating chilled water through the building to individual room air handling devices. Large water chilling machines typically have centrifugal type compressors used to chill the water. Such machines are usually coupled with the building electrical system through a conventional electro-magnetic starter. The starter itself may cost from $1,500 to $8,000, and contains numerous heavy power wires and electrical components such as contactors, overload relays, control and current transformers, time delay and control relays. These items have moving parts and open contacts. They develop heat and are subject to deterioration, the pitting and burning of the contact points being a frequent problem. If the starter door can be opened, debris and dust accumulation seem to be inevitable. Periodic maintenance should be maintained also to guard against the effects of vibration and insulation aging, but unfortunately, maintenance is usually advocated more than it is practiced.

At the job site the electrical contractor must interconnect the wiring between the chiller and the standard type starter furnished by the mechanical contractor, sometimes over distances of 50 feet and more. Frequently, there is misunderstanding between the electrical and mechanical contractors or with the specifying engineer. Various makes of chillers and starters may be used together and may require mounting of special small controls and relays in the starter. This information is not always known in advance, leading to unpleasant surprises.

In spite of difficulties with the electro-mechanical starter, it has heretofore provided the standard and only means of starting and stopping large motors of the type used in water chillers.

The present invention is directed toward a new solid state starter especially useful with large centrifugal chillers. The invention overcomes many of the disadvantages of the conventional electro-mechanical starter.

One feature of the new solid state starter, according to the invention, is that it is mounted on the chiller compressor. All control and power wires are connected at the factory, and the complete assembly can be operated under load with a chiller before it leaves the factory. The floor space saved by the invention is an important consideration in crowded equipment rooms.

Another feature of the new starter is the use of silicon controlled rectifiers, or SCR's, for controlling current to the compressor motor. Each phase utilizes two SCR's: one for the upper half of the electrical current sine wave; the other, for the lower half of the sine wave. Six are used for each three phase machine. The SCR's turn the current off and on — silently and with no moving parts. The gate trigger signal pulses the SCR at the desired electrical phase angle. This current flow is extinguished on each half cycle as the sine wave crosses zero. The control circuits not only turn the chiller motor off and on but can control the amount of current. Three rectangular silicon controlled rectifier clusters, with two SCR's each, are mounted in a sealed starter box attached to the motor terminal box. Liquid refrigerant flows through the starter box to hold the temperature of the SCR's under 150° F. This arrangement thus provides silent on-off switching of current by a completely sealed mechanism with no moving parts and no exposure to debris and dust or inexpert tampering. In contrast, a conventional electro-mechanical starter has many moving parts, oil dash pot overload relays, springs, and contacts. It clatters shut with highly visible arcing and noise.

A further feature of the invention relates to the electronic control modules, all solid state, which are included with the new starter. One of these is a trigger module which triggers the SCR's at controlled firing angles in the line voltage cycle to regulate the current flow to the large chiller motor. It receives its control signals from a current module. The current module senses actual motor current and regulates delivery of same to the motor during the starting cycle. The circuit provides rigid programmed control of starting current with a smooth steady change in SCR firing angle during motor acceleration. The module also provides current overload protection. A third control module is the voltage safety module. It contains three safety circuits which protect the motor against electrical emergencies, specifically against three phase voltage unbalance, undervoltage and phase reversal.

Each control module contains a circuit board assembly inserted into a suitable sheet metal enclosure. The enclosure is filled with a potting compound and is sealed closed. All circuits are thereby protected against contamination from dust, moisture, vibration, and tampering. External terminals provide for connection of wires to the module circuit.

The three modules just described mount in a motor control panel which is disposed in front of the starter box. The starter box and the motor control panel along with a terminal box and a control connection box, are mounted together on the compressor. They are designed for convenient access to all internal components and to minimize wiring complexity.

One outstanding benefit of the new starter is its outstanding reliability. The reliability is provided in part by factory mounting the starter on the chiller thus eliminating mistakes due to field wiring. U.S. Underwriters Laboratory approval of both starter and chiller and the combination is a first, an indication of unusual safety and reliability. Reliability also accrues because all controls are hermetically sealed from contamination and inexpert tampering. Sold state construction eliminates moving parts.

Another major benefit is lower cost for a completely installed system. While the solid state starter components may be more expensive than the corresponding electro-mechanical components, the completely installed system will be less expensive. This is because virtually all field wiring is eliminated. Another cost savings is reduction in floor space. Another cost benefit is that start-up costs are reduced. Since the combination chiller and starter can be factory tested together, they can be delivered as a complete package ready for connection to the building electrical supply. Start-up procedures are greatly simplified and shortened. Back charges are reduced. With electro-mechanical starters installed by electrical contracting specialists, there arise frequent disputes over field mounting of control components, responsibility for cost of changes, and additions to the control wiring. All these problems are eliminated by the present invention.

Another major benefit is that the starter provides many extra performance, safety and reliability features, some of which are available in electro-mechanical starters but only at substantially extra cost. The solid state control provides much better starting current control than across-the-line, autotransformer, or star-delta closed transition starters.

The solid state current module provides a smooth start with current never exceeding about 170% of full load under normal conditions. This permits substantially lower electrical operating costs where electric utilities charge higher rates for higher starting current surges. The design of the current control package of the solid state control permits the motor to come up to full speed even if voltage at the starter falls 35% below normal. An average star-delta starter will not bring the motor up to speed if the voltage drops more than 10% below normal. By eliminating high starting current spikes, electrical line transients in electrical distribution systems are attenuated.

Another extra performance feature is factory-set overloads. The current module is set, with a limited field adjustment, to interrupt the voltage applied to the motor if a current in excess of 200% rated load current is encountered during the starting period. After starting, a fault will also be indicated on the starter instrument panel if the current exceeds 120% of rated load current use since current should remain under 105%. This overload control is not temperature sensitive. Unlike mechanical starters, it is factory set and tested.

Longer motor and starter life through excellent protection is another feature of the solid state starter. In the voltage control module the following faults are immediately recognized and the motor is protected against them: voltage phase unbalance exceeding 2% for more than one second; primary signal phase fault, both in power source transformer and in primary distribution supply; secondary single phase fault; SCR short or open; control circuit fault; motor short, open, or ground; voltage more than 15% below rated; accidental phase reversal.

Additional features, benefits and advantages will be seen in the following description and claims which are to be considered in conjunction with the accompany drawings illustrating a preferred embodiment of the invention according to the best mode presently contemplated in carrying out the several aspects of the invention.

BRIEF DESCRIPTION OF THE DRAWINGS

FIG. 3 is a front view, having a portion broken away, of the starter control panel used with the chiller to FIG. 1.

FIG. 4 is a front view, having portions broken away, of the control connection box, the terminal box, and the starter box, used with the chiller of FIG. 1.

FIG. 5 is a view taken in the direction of arrows 5—5 in FIG. 4.

FIG. 6 is a view taken in the direction of arrows 6—6 in FIG. 4.

FIG. 7 is an enlarged view taken in the direction of arrows 7—7 in FIG. 4.

FIG. 8 is an enlarged view taken in the direction of arrows 8—8 in FIG. 4.

FIG. 9 is an enlarged view taken in the direction of arrows 9—9 in FIG. 4.

FIG. 10 is a rear perspective view of the boxes illustrated in FIG. 4.

FIG. 11 is a schematic diagram in block diagram form of the electronic control portion of the controls associated with the chiller of FIG. 1.

FIG. 12A and 12B, should be considered together and constitute a detailed electronic schematic diagram of the static starter and overload protector circuitry of the electronic control.

FIGS. 13A, 13B and 13C should be considered together and constitute a detailed electronic schematic circuit diagram of the voltage safety circuitry of the electronic control.

FIGS. 16A and 16B should be considered together and constitute a wiring connection diagram for a portion of the controls.

DESCRIPTION OF THE PREFERRED EMBODIMENT

Chiller Configuration

Figure 1:
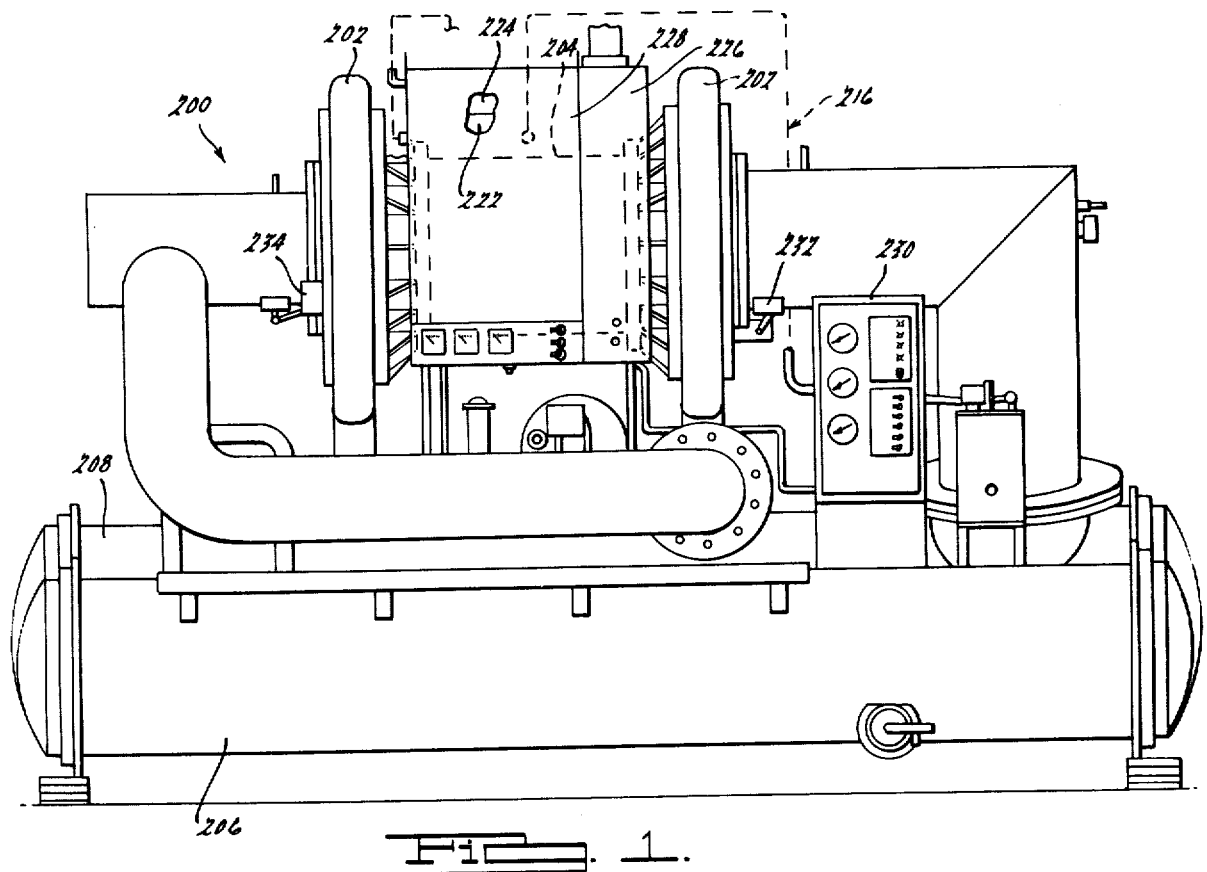
FIG. 1 is a front view of a centrifugal chiller embodying principles of the present invention.
Figure 2:
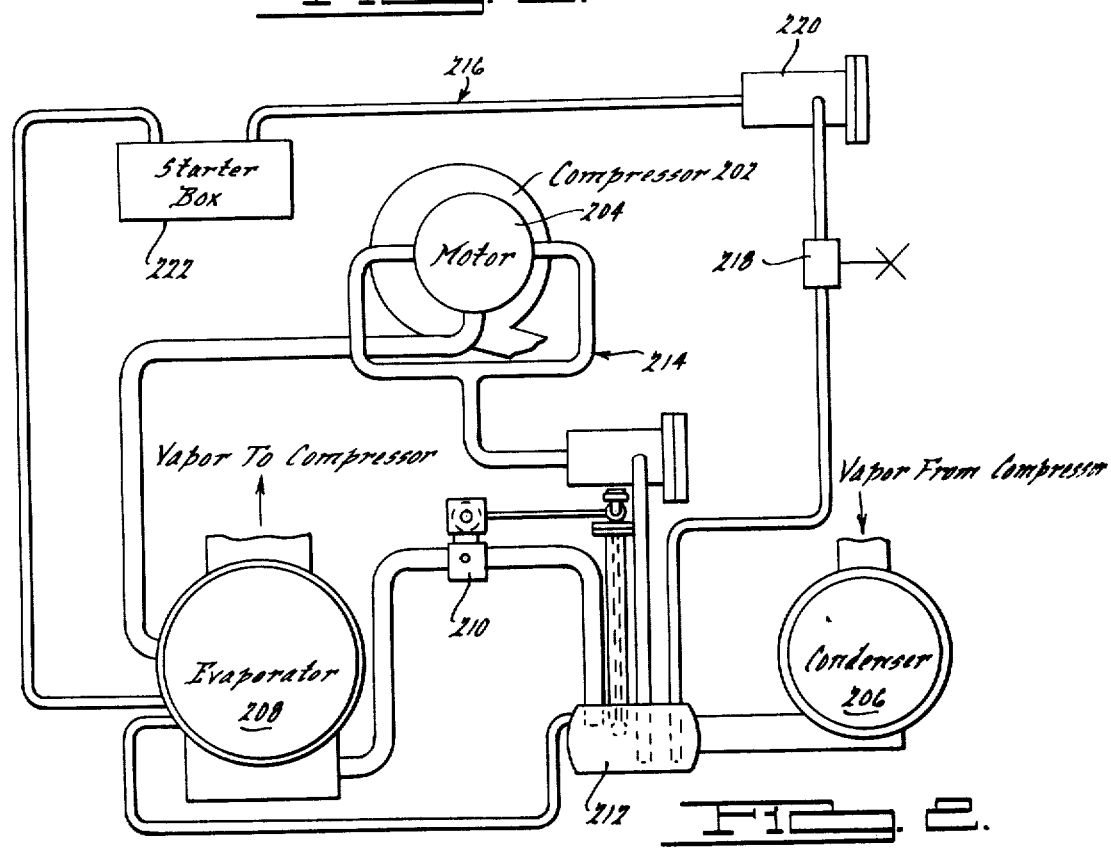
FIG. 2 is a schematic diagram of the refrigeration circuit of the chiller of FIG. 1.

FIGS. 1 and 2 illustrate a chiller 200 embodying principles of the present invention. The mechanical refrigeration system per se is for the most part generally conventional. The chiller is illustratively shown as being of the two-stage centrifugal type commonly used in the air conditioning systems of large buildings.

Chiller 200 comprises: a two-stage compressor 202 powered by a three-phase electrical induction motor 204; a condenser 206 having a sump 212; an evaporator 208; and a liquid control valve 210. Compressor 202, condenser 206, evaporator 208 and valve 210 are connected in refrigeration circuit as schematically illustrated in FIG. 2 such that when motor 204 is energized to power compressor 202, refrigerant is circulated through the system to chill water which is circulated through the evaporator for subsequent distribution to the spaces in the building to be cooled. Heat is rejected to water circulating through condenser 206. An auxiliay refrigeration circuit 214 cools motor 204.

Chiller Controls Configuration

Additionally, for a portion of the controls of the present invention there is provided a second auxiliary refrigeration circuit 216 including a shut off valve 218 and a filter-dryer 220. This circuit provides cooling for a starter box 222 containing a portion of the controls for chiller 200, and permits liquid refrigerant to flow through starter box 222 and thereby absorb heat generated by electronic devices contained therein.

Considering FIG. 1 in greater detail there are provided, in addition to starter box 222, three additional boxes, on panels, which mount between the two compressor stages in front of motor 204. These are, a control connection box 224, a terminal box 226 and a motor control panel 228. As viewed in FIG. 1, motor control panel 228 is disposed in front of the two boxes 222, 224 with the latter two boxes being arranged one on top of the other as shown. Box 226 is disposed to the right hand side of all three boxes 222, 224 and 228. Further details of this arrangement can be seen in FIG. 10 which views the boxes perspectively from the rear. The four boxes are mounted together, as will be explained, to form a compact, yet highly serviceable and functional arrangement for the chiller controls. FIG. 1 further shows a unit control panel 230 mounted on chiller 200 toward the right hand end thereof. Motorized controls 232 and 234 control the compressor pre-rotation vanes.

FIGS. 3 through 10 illustrate further details of the four electrical boxes 222, 224, 226, 228. FIG. 3 illustrates motor control box 228 with the main front panel thereof broken away. This box contains three electronic modules which are a trigger module 236, a voltage safety module 238, and a current module 240. A field adjustment unit 242 is also in box 228. A wiring harness 244 interconnects these and exits the box via a conduit 246 which leads to control connection box 224. A lower panel 248 containing three ammeters 250, 252 and 254 and three circuit breakers 7CB, 8CB and 9CB is hingedly mounted on box 228 by means of a hinge 256 which permits the panel to be swung downwardly and forwardly as indicated by the arrow 258 in FIG. 6. Also contained within box 228 behind panel 248 are three relays 3R, 4R, and 5R. The wiring harness 244 makes connection to the components on panel 248 and the three relays.

Box 228 is itself hingedly mounted on box 224 by means of hinges 260 as shown in FIG. 6. This permits the entire box 228 to be swung forwardly and upwardly from its normal position as shown by arrow 262, to render the two rear boxes 224 and 222 accessible from the front of the chiller as viewed in FIG. 1. An extensible strut 264 is provided on the rear of box 228 to be slid into a tube 265 (FIG. 4) in box 224 and support box 228 in an out swung position 90° from normal. Boxes 224, 226 and 222 are secured together but possess removable panel members for access to their interiors. The unit formed by the four boxes mounts entirely on the motor terminal box provided with electric motor 204. The existing motor terminal box cover is removed from the terminal box and replaced by a new cover 266 which adapts box 222 to the terminal box. A series of fasteners such as 268 secure box 222 to the motor terminal box. Six feed-through terminals 270, 272, 274, 276, 278 and 280 effect electrical connection from circuit components in box 222 to motor 204.

FIGS. 4 and 6 through 9 illustrate starter box 222 and the components interior thereto in greater detail. Basically, starter box 222 provides an enclosure containing current-carrying semi-conductor devices which control the current delivered to electric motor 204. Since these current-carrying semi-conductor devices customarily generate a substantial amount of heat when in operation, the starter box 222 is constructed to provide for circulation of liquid refrigerant through the box to cool the semi-conductor devices. More specifically, the illustrated embodiment illustratively incorporates six SCRs for the six semi-conductor devices designated SCR 1A, SCR 2A, SCR 1B, SCR 2B, SCR 1C, SCR 2C. The SCR's are arranged in three groups of two and each group is contained in a semi-conductor mounting arrangement 282, 284, 286. SCR 1A and SCR 2A of mounting arrangement 282 are electrically associated with phase A of the three phase supply; SCR 1B and SCR 2B of mounting arrangement 284 with phase B; and SCR 1C and SCR 2C of mounting arrangement 286 with phase C. Three electrical feed-through terminals 288, 290 and 292 mount on the side wall of box 222 to permit the three phase lines A, B, and C which enter terminal connection box 226 to be electrically connected with the respective mounting arrangements. The juxtaposed wall of box 226 has a rectangular cutout 226a disposed over the side wall of box 222 on which terminals 288, 290, and 292 mount so that the lines A, B, and C may be respectively connected therewith. The illustrated connection technique contemplates a rectangular plate 226b which attaches to the free end stud of each terminal. Joined to each plate are a series of five receptacles 226c into each of which the stripped end of a line cable can be inserted and locked in place by a lug 226d. The number of receptacles of each phase which are put to use will depend upon the current rating of the starter. The structure is rigidifed by a pair of insulator spacers 226e at each end of each plate 226b. The insulators forming each pair are joined together. The inner insulator of each pair is affixed to the side wall of box 222 and a fastener 226f attaches the plate to the outer insulator of each pair. Each insulator comprises a non-conductive body into whose opposite ends threaded female inserts are embedded. The inserts in each element are separated from each other by the non-conductive body. The two insulator spacers of each pair are joined by a threaded stud and a threaded stud secures the inner insulator of each pair to the wall of box 222.

Figure 16A:
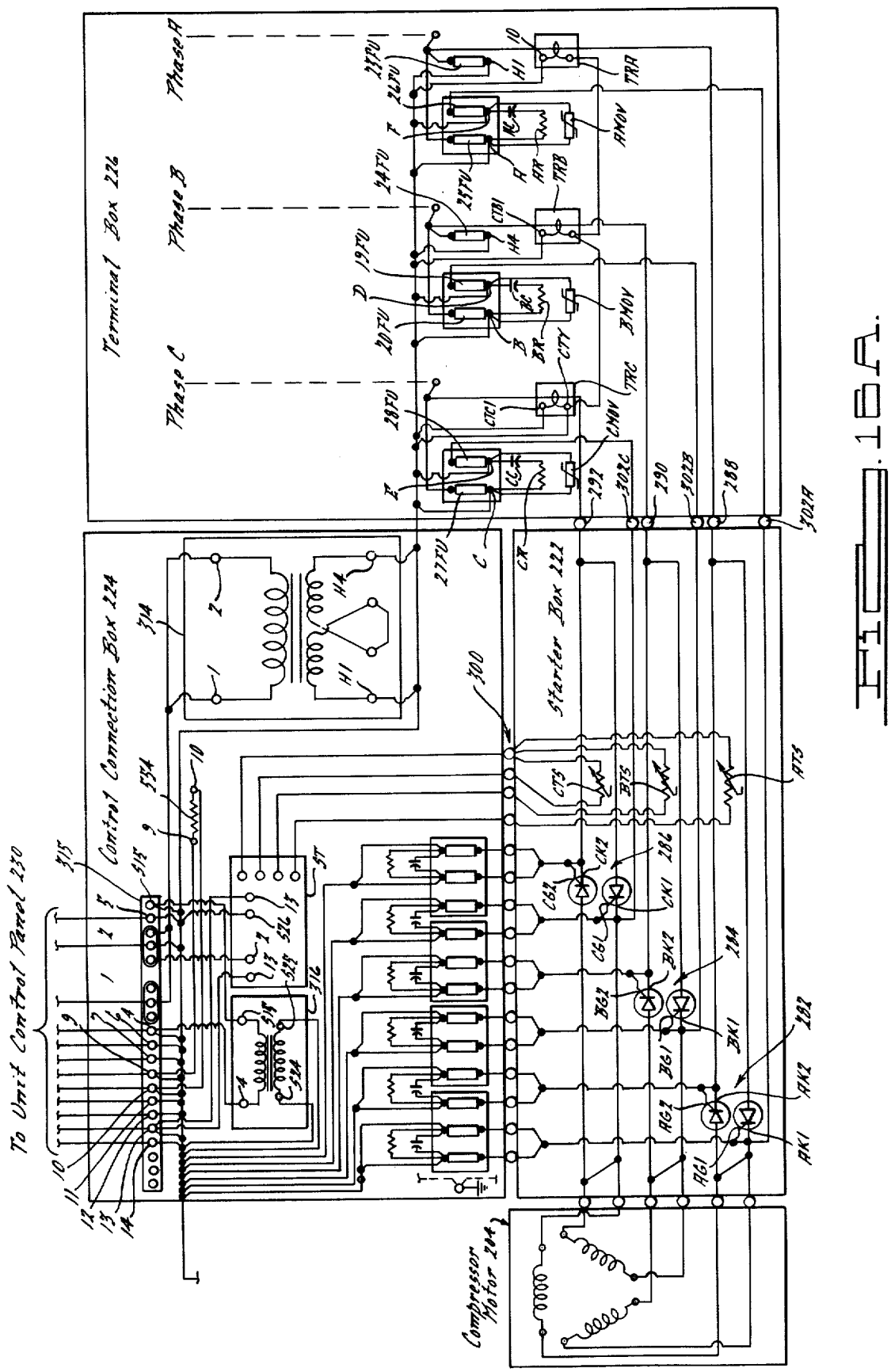

The end of each feed-through terminal 288, 290, and 292 within box 222 is attached by sandwiching between a pair of conductor plates of the corresponding SCR mounting arrangement 282, 284, 286. One of these conductor plates cooperates with a third conductor plate to clamp one SCR while the other of these conductor plates cooperates with a fourth conductor plate to clamp the other SCR. For example in FIGS. 7 and 8, the end of the terminal 290 is sandwiched between plates 284a and 284b; plate 284a cooperates with a third plate 284c in claimping SCR2B while plate 284b cooperates with a fourth plate 284d in clamping SCR1B. Plate 284a is disposed in conductive contact with the cathode of SCR2B; plate 284b, with the anode of SCR1B; plate 284c with the anode of SCR2B; and plate 284d, with the cathode of SCR1B. Hence, plates 284a and 284d can be referred to as cathode plates and plates 284b and 284c as anode plates. The entire assembly is held together by throughbolt and each anode plate is insulated from its corresponding cathode plate. In this way, the phase A line is connected electrically to mounting arrangement 282, the phase B line to mounting arrangement 284 and the phase C line to mounting arrangement 286. The two SCR's in each mounting arrangement are thereby arranged such that the corresponding phase line is electrically connected to the anode of one SCR and to the cathode of the other SCR. The anode of the other SCR and cathode of the one SCR are electrically connected to motor 204. The present arrangement effects electrical connection of the SCR's to the motor by providing a set of three conductor block units 294, 296, and 298 which are located within box 222. Unit 294 attaches to feed-through terminals 270 and 272, unit 296 to terminals 274 and 276 and unit 298 to terminals 278 and 280. Two pairs of conductor cables connect each unit 294, 296 and 298 to the corresponding semi-conductor mounting arrangement 282, 284, and 286; one pair to the anode plate of one SCR and the other pair to the cathode plate of the other SCR. FIG. 16A illustrates schematically the circuit configuration wherein motor 204 is connected in delta with the line through the two oppositely poled SCR's in each phase. The gate and cathode triggering terminals on each SCR are individually connected via individual shielded conductors to individual feed-through terminals 300 providing circuits between box 222 and box 224. It will be observed that the connections at each gate and cathode terminal of each SCR are made such that each conductor wire extends first downwardly to the bottom of the stack and then horizontally toward the side wall of the enclosure. The horizontally directed portions are supported from one of the stack plates by a looped support strap. The conductors form a bundle which extends upwardly to the top wall of the enclosure and then across the enclosure to the feed-through terminals 300. This arrangement for the conductor wires has been found to provide reliable connections to the SCR's and thereby solve a previous problem of broken connections at the SCR's believed caused by the flow of refrigerant in the enclosure. Also, mounted on each mounting arrangement is a temperature sensor ATS, BTS and CTS which electrically connects via lead wires through other feed-through terminals 300 between boxes 222 and 224. Each of the sensors is located in a groove cut into the edge of one of the plates in the stack and provides a true indication of an overheat condition. Additional feed-through terminals 302A, 302B and 302C are provided on the side wall of box 222 into box 226.

A large rectangular opening in the front face of box 222 is covered by a removable cover plate 304 which attaches by means of fasteners 306. A sealing gasket 308 is preferably provided between two. Likewise, a sealing gasket is preferably provided between cover 266 and the opening in the rear wall of box 222 which it covers. In use, the interior of box 222 is flooded with liquid refrigerant which is introduced via an inlet pipe 310 at the rear wall of box 222 and exits via an outlet pipe 312 at the side wall adjacent the inlet pipe. The inlet pipe 310 is located to discharge liquid refrigerant directly onto the upper most SCR mounting arrangement 286. The refrigerant will flow to fill the level of the box until it reaches the level provided by outlet 312. Thus, at all times, the SCR's are immersed in refrigerant which is extremely efficient in cooling the semi-conductor devices. Sight glasses 313 are located in the sidewall of the box 222 to permit personnel to observe the interior of the box. A drain, which is closed by a removable plug, is provided in the bottom of the box to allow the enclosure to be drained when required. By making outlet 312 in the form of an internally threaded fitting, maintenance personnel may, upon removal of cover plate 304 after the enclosure has been drained, close the return line so that backflow of refrigerant into box 222 does not occur. As an aid to maintenance personnel, a ledge is provided at the bottom of the enclosure (see FIG. 6.) to assist in supporting cover plate 304 during removal thereof. Preferably the entire outside of the enclosure is covered by a suitable insulator to avoid condensation.

Control connection box 224 contains several elements certain of which are not shown in FIGS. 4 and 6 in the interest of clarity. However, all elements are shown in the wiring connection diagram of FIG. 16A. Box 224 contains a main control transformer 314, a safety unit ST operably associated with the sensors ATS, BTC and CTS, a transformer 316 and a terminal board 315. Transformer 314 supplies 115 VAC power for the electromechanical portion of the control, transformer 316 supplies a 24 volt potential for the electronic portion of the control and terminal board 315 provides a means for connecting various wiring harnesses with each other. Also provided within box 224 are a plurality of suppression networks which are associated with the gate-cathode trigger terminals of the six SCR's in starter box 222.

FIGS. 4 and 5 illustrate detail of terminal box 226. Power cables for each of the three phases A, B and C enter box 226 from the top via a conduit 320. Three current transformers TRA, TRB and TRC are disposed each around one of the feed-through terminals 288, 290, and 292 to provide a signal indicative of current flow in that phase for use in a manner to be explained in greater detail hereinafter. The two phases A and B are used to energize the primary winding of transformer 314, and this energization is through a pair of fuses 23 FU, 24 FU. A suitable connecting conduit 328 is provided between boxes 226 and 224 for the wires between the two boxes. Also associated with each phase and contained within box 226 (but appearing only in FIG. 5) are a pair of fuses and a suppressor network consisting of three devices. In FIG. 5 these components associated with phase A are identified as fuses 25 FU, 26 FU, a varistor AMOV, a resistor AR and a capacitor AC; with phase B, fuses 19 FU, 20 FU, and a varistor BMOV, a resistor BR, and a capacitor BC; and with phase C, fuses 27 FU, 28 FU, a varistor CMOV, a resistor CR and a capacitor CC. The three feed-through terminals 302A, 302B and 302C, are each associated with a corresponding phase and each serves to connect a wire from the motor side of each of the three SCR mounting arrangements within starter box 222 to one of the phase fuses within box 226.

BLOCK DIAGRAM OF CONTROLS

FIG. 11 illustrates in block diagram form the control electronics according to the present invention. The control electronics includes the static starter and overload protector circuitry and the voltage safety circuitry. Electrical power for compressor motor 204 is supplied from the 3-phase A.C. supply designated generally at 100 (for example, 460 VAC, 60 hz as in the present embodiment) through the bank of six SCR's, each pair of SCR's being connected in one of the three phase lines and the two SCR's of each pair being oppositely poled. The static starter of the present invention operates the bank of SCR's to regulate starting current drawn by the compressor motor from supply 100 during each half cycle of each voltage phase so that normal motor starting currents are not exceeded as the motor accelerates.

The static starter and overload protector circuitry is contained within current module 240 and includes a D.C power supply 108 which is energized from the secondary of transformer 314, (for example, 115 VAC, 60 hz as in the present embodiment). Transformer 314 is coupled to D.C. power supply 108 through the electromechanical relay control designated generally by the numeral 102 and the step down transformer 316. As will be explained in greater detail hereinafter, A.C. power from transformer 314 is controllably applied by relay control 102 to transformer 316 to thereby controllably energize power supply 108. Briefly, when the compressor motor is running under a non-overload condition, relay control 102 permits power to be supplied; however when an overload condition is detected, the overload protector of the present invention disconnects the transformer from D.C. power supply 108 and shuts down compressor motor 204. D.C. power supply 108 develops the D.C. voltage level (or levels) used in the static starter and overload protector (for example, +10 VDC and +32 VDC as in the present invention).

The static starter of the system includes a ramp generator circuit 110 which generates a voltage ramp used to start the compressor motor. The application of the +32 VDC potential from power supply 108 to ramp generator 110 permits ramp generator 110 to develop the voltage ramp output. In order to assure that the D. C. potentials of power supply 108 have had ample time to stabilize after power supply 108 has been energized from transformer 314, a power-up delay circuit 112 is connected between power supply 108 and ramp generator 110 to inhibit operation of the latter for a given delay period (for example, approximately 110 millisecond delay as in the present embodiment). The output of ramp generator 110 is coupled to three identical sets of trigger circuits in trigger module 236. The output circitry of each trigger circuit is operatively coupled with a corresponding pair of SCR's. Briefly each trigger circuit supplies phased trigger pulses to the corresponding pair of SCR's to cause the latter to conduct current to the compressor motor. At starting of the compressor motor these trigger pulses are phased in relation to the three phase A.C. supply 100 such that the SCR's conduct for only a limited portion of each half cycle to thereby limit the starting current drawn by the compressor motor. The output voltage ramp of ramp generator 110 causes the phase of the trigger pulses to change so that the SCR's become increasingly conductive for an increasing portion of each half cycle as the ramp is generated. When the ramp attains its maximum value, the phase of the trigger pulses is such that the static switches exhibit maximum conduction thereby connecting the three-phase A.C. supply 100 to the compressor motor for essentially the full duration of each half cycle. The current drawn by the motor is monitored by a motor current sensing circuit 116 which provides a motor current signal to ramp generator 110. This motor current signal is used in developing the ramp output of the ramp generator 110, and hence, it will be observed that a closed loop type of system is provided. In this maner, the static starter operates to bring the compressor motor up to running speed without exceeding allowable motor starting currents.

An end of ramp circuit 118 is also operatively coupled to the output of ramp generator 110 and gives an output signal at the termination of the ramp. Circuit 118 serves to interlock the chiller vane controls 232, 234 so that the vanes cannot be opened until the ramp terminates. This assures that the compressor motor is running at full speed before it is brought under load.

The overload protector of the present invention serves to disconnect A.C. supply 100 from the compressor motor should a motor overload be detected. Importantly, according to one aspect of the invention, the overload protector is integrated with the static starter so that different overload levels are established during starting and running. The motor current signal developed by motor sensing circuit 116 is also supplied to both a run overload detector circuit 120 and a start overload detector circuit 122 as well as to a timer circuit 124. A run overload reference signal is supplied to run overload detector 120 while a start overload reference signal is supplied to start overload detector 122. Timer circuit 124 supplies timed output signals in the form of a run signal to run overload detector 120 and a start signal to start overload detector 122. The respective outputs of circuits 120 and 122 are supplied to an overload detection latch circuit 126. The output of latch circuit 126 is connected to an oscillator circuit 128 and in turn a solid state swich 130 and relay control 102. Briefly, if either of the overload detector circuits 120, 122 detects an overload condition, overload detection latch 126 is switched from an unlatched to a latched condition to thereby cause oscillator 128 to begin oscillating at a relatively high frequency in comparison to the frequency of the A.C. supply, (for example, 10 khz). The high frequency oscillations from oscillator 128 are used to trigger solid state switch 130 which in turn causes relay control 102 to disconnect transformer 314 from D. C. supply 108 and in turn prevent the SCR's from conducting current to the compressor motor. Hence, when an overload condition is detected by either overload detector circuit 120, or 122, the compressor motor is shut down.

Timer circit 124 serves to gate the respective overload detectors 120, 122 during starting and running. The timing base is derived from the A.C. output of transformer 316 which is at 60 hz. As soon as motor current is sensed by motor current sensing circuit 116, timer circuit 124 begins timing. For a very short instant (for example 16/60 second as in the present embodiment) neither the start signal nor the run signal is generated thereby precluding any overload detection during this instant. This is desirable in avoiding unwanted shutdown of the motor which might otherwise occur because of any momentary high starting current transients. The interval is, however, sufficiently short that damage is avoided if a true overload condition exists. Immediately thereafter, a start signal is supplied to start overload detector 122 to enable start overload detector 122 to detect an overload condition. The start signal continues for the duration of the motor starting period (about 55 seconds in the present embodiment). At the conclusion of the motor starting period, the start signal is terminated and concurrently the run signal is supplied to run overload detector 120 enabling the latter to now detect an overload condition. However, the respective overload conditions for which the two overload detectors 120, 122 are set differ. Run overload detector 120 is responsive to a lower overload level than is start overload detector 122. For example, as in the present embodiment, start overload detector 122 is responsive to any overload which exceeds 200% of the rated compressor motor full load current while run overload detector 120 is responsive to any overload which exceeds 110% of full load compressor motor current. In this manner, higher motor currents are permitted during the motor starting period with lower motor currents being thereafter permitted during normal running of the motor.

The voltage safety portion of the control, which is contained within voltage safety module 238, comprises a three phase step-down transformer and set of rectifiers designated generally by the reference numeral 140. The transformer phases are connected across the SCR's to monitor the line voltage of one phase with respect to the load voltage of the opposite phase; this will be explained in detail later. The stepped-down transformer voltages are supplied to an unbalanced voltage detector circuit 142, an undervoltage detector circuit 144, and a phase reversal detector circuit 146. These latter three circuits are connected to a time delay circuit 148 which is in turn connected to an output circuit 150. Circuit 150 is connected to relay control 102. Briefly, when either an unbalanced voltage, an undervoltage, or a voltage phase reversal is detected, power to the compressor motor is stopped thereby shutting down the chiller.

DETAILED SCHEMATIC DIAGRAM OF STATIC STARTER AND OVERLOAD PROTECTOR (CURRENT MODULE 240)

Figure 12B:
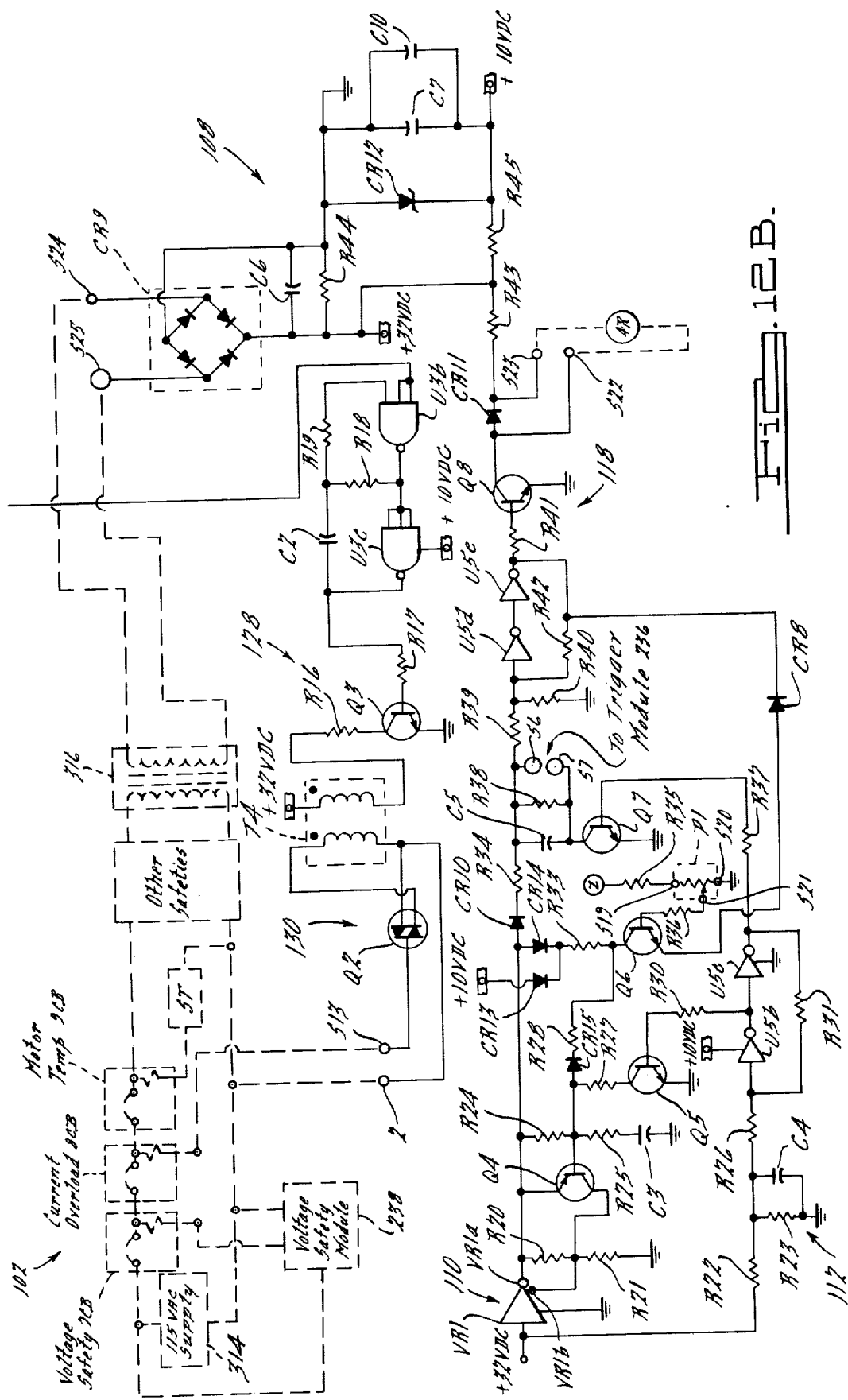

A detailed schematic diagram of the static starter and overload protector portion of the system shown in FIG. 11 is shown in FIGS. 12A and 12B which should be considered together. At the upper left hand corner of FIG. 12B, transformer 314 is coupld through relay control 102 to the primary of step-down transformer 316. Relay control 102 is illustrated as comprising a unique circuit containing a number of shunt-trip circuit breakers which monitor various operating parameters of the chiller system and which operate to interrupt power from transformer 314 to transformer 316 when an undesired condition of any of the parameters occurs. One of these circuit breakers is designated as a voltage safety 7CB, another as current overload 8CB, and the third as motor temperature 9CB. Other identical breakers are also employed. Voltage safety 7CB is operatively coupled with the voltage safety module 238 to interrupt the connection between transformers 314, 316 when a voltage fault occurs. Current overload 8CB is operatively coupled with current module 240 to break the connection between the transformers when the overload protector senses an overload in the compressor motor. Motor temperature 9CR is operatively coupled with module ST to break the connection when excessive motor temperature occurs.

The secondary of transformer 316 is coupled to power supply 108 which comprises a full-wave rectifying diode bridge CR9 connected across the secondary of transformer 316 to provide across a capacitor C6 and a resistor R44, a 32 volt D.C. potential of positive polarity relative to ground. A dropping resistor R45 is connected in series with the parallel combination of a zener diode CR12 and two capacitors C7 and C10 to provide a 10 volt D.C. potential of positive polarity. These two D.C. potentials are supplied to the various electronic circuit elements shown in FIGS. 12A and 12B, such as inverters, NAND gates, NOR gates, etc. (It will be appreciated that since many of these individual elements are contained on common circuit modules, the D. C. potentials are illustrated as being supplied to only certain ones of the circuit elements.)

Ramp generator 110 is shown near the lower left-hand corner of FIG. 12B and includes a voltage regulator VR1 whose input is connected to the 32 volt D. C. potential. The output of regulator VR1 is taken between terminals VR1a and VR1b. Briefly, regulator VR1 is a circuit device which provides a voltage signal between its output terminals VR1a, VR1b whose magnitude is a function of the value of the impedance externally connected to these terminals. In the present embodiment, a resistor R20 is connected between terminals VR1a and VR1b and ground. The emitter-collector circuit of a PNP transistor Q4 is connected across the output of regulator VR1 with the emitter being connected to terminal VR1a and the collector to terminal VR1b. These circuit elements cooperate to generate a ramp voltage in the form of a positively increasing voltage output as measured at terminal VR1a with respect to ground. This is accomplished by progressively decreasing conduction of transistor Q4 thereby progressively increasing the external impedance across terminals VR1a and VR1b of voltage regulator VR1 and hence, progressively raising the potential of VR1a.

The conduction of transistor Q4 is determined by three input circuits connected to its base terminal. One of these three input circuits includes a transistor Q5 whose emitter-collector connects through a resistor R27 to the base of transistor Q4; this input circuit is responsive to power-up delay circuit 112 and operates to force transistor Q4; this input circuit is responsive to power-up delay circuit 112 and operates to force transistor Q4 into conduction during the power-up delay so as to maintain a constant potential at terminal VR1a during the delay. A second input circuit for transistor Q4 is operatively coupled with motor current sensing circuit 116 to vary the base current in transistor Q4 in accordance with the compressor motor current. This second input circuit operates to cause generation of the ramp and includes a diode CR15 and a resistor R28 connected in series from the base of transistor Q4 of the collector of a transistor Q6. The collector of transistor Q6 is coupled through a resistor R33 and a diode CR13 to the 10 volt D. C. potential while resistor R33 is also coupled through a diode CR14 to terminal VR1a. Because the ramp at terminal VR1a begins at only around a four volt potential, the design insures that the collector of transistor Q6 is biased to a 10 volt potential until the ramp output at terminal VR1a begins to exceed such a potential. The base circuit of transistor Q6 is coupled wih motor current sensing circuit 116 via the terminal designated Z. As will be explained in greater detail in connection with the description of FIG. 12A the signal at terminal Z is proportional to the magnitude of compressor motor current. This signal is scaled through resistor R35 and a pre-set calibration potentiometer P1 to provide appropriate attenuation at the base of transistor Q6. Basically, the conductivity of transistor Q6 is related to the current drawn by the compressor motor and the conductivity of transistor Q6 is used to vary the conductivity of transistor Q4 and thereby generate the ramp signal at terminal VR1a. The third input circuit connected to the base of transistor Q4 is a limiter which consists of a resistor R24, a resistor R25 and a capacitor C3 connected as illustrated. The purpose of this limiter is to limit the rate of change of conduction of transistor Q4 to a predetermined maximum and thereby in turn limit the rate of change of the voltage ramp.

Continuing further with the description of ramp generator 110, terminal VR1a is coupled through a diode CR10 and a dropping resistor R34 to the parallel combination of a capacitor C5 and a resistor R38. Capacitor C5 and resistor R38 are in turn coupled through the emitter-collector circuit of a transistor Q7 to ground. As will be seen later, transistor Q7 is coupled with power-up delay circuit 112 and can conduct only after the power-up delay has occurred. The output voltage ramp, which is developed by circuit 110 and supplied to trigger circuits in module 236, is taken across capacitor C5 and resistor R38 at terminals designated 56 and 57. The voltage ramp developed across terminals 56 and 57 represents essentially an attenuated version of the ramp signal developed at terminal VR1a. Because transistor Q7 is prevented from conducting during the power-up delay, essentially a zero potential signal is supplied to the trigger circuits until the power-up delay has elapsed. After this time transistor Q7 becomes fully conductive to permit charging of the capacitor C5 and the ensuing generation of the output voltage ramp to the trigger circuits.

Power-up delay circuit 112 is shown generally at the lower left-hand portion of FIG. 12B and includes resistor R22 and R23 and a capacitor C4 connected as illustrated across the 32 volt D. C. supply. This circuit exhibits a certain time constant which determines the duration of the power-up delay and which is provided by the charging of capacitor C4 after the 32 volt supply is energized. The voltage developed across the capacitor C4 is supplied through a dropping resistor R26 to the input of an inverter U5b. The input of a second inverter U5c is connected to the output of the first inverter U5b and a feedback resistor R31 is connected from the output of inverter U5c to the input of inverter U5b. The output of the first inverter U5b is also coupled through a resistor R30 to the base of transistor Q5 while the output of the second inverter U5c is coupled through a resistor R37 to the base of transistor Q7. The two transistors Q5, Q7 provide the output signals of power-up delay circuit 112 to inhibit operation of ramp generator circuit 110 until the imposed delay has elapsed. Each inverter U5b, U5c provides a logical output signal which is the inverse of the logical input signal applied to it. Hence, when a high signal is applied to the input of an inverter, its output is low and vice versa. Therefore, when D. C. power supply 108 is off (i.e., not energized), both the 10 volt and 32 volt potentials are absent and neither transistor Q5 nor Q7 can conduct. However, when power supply 108 is turned on, the 10 volt D. C. potential is supplied to inverters U5b, U5c and the 32 volt potential is supplied to the input of power-up delay circuit 112 to begin charging capacitor C4. Because of the delay imposed by capacitor C4, it will happen that initially the output of inverter U5b will be high and the output of inverter U5c low. In this condition transistor Q5 is rendered conductive while transistor Q7 is rendered non-conductive. The power-up delay terminates when the voltage developed across capacitor C4 reaches a magnitude sufficient to apply a high input signal to inverter U5b. When this happens, the output of inverter U5b switches from high to low thereby rendering transistor Q5 non-conductive and the output of inverter U5c switches from low to high rendering transistor Q7 conductive. The feedback connection of resistor R31 provides a slight hysteresis characteristic which is desirable in the switching operation. Hence, power-up delay circuit 112 provides control signals via transistors Q5 and Q7 which delay the output of ramp generator 110 during initial start up.

The end of ramp detector circuit 118 includes resistors R39 and R40 which are connected as illustrated across the output of the ramp generator. The signal across resistor R40 is supplied to the input of an inverter U5d. The output of inverter U5d is supplied to a further inverter U5e whose output is connected via a feedback resistor R42 to the input of inverter U5d. The output of inverter U5e also feeds through a resistor R41 to the base of a transistor Q8 which provides the signal for relay 4R, the run relay in the system relay control. The emitter-collector circuit of transistor Q8 connects through as diode CR11 and a resistor R43 across the 32 volt D. C. supply. Prior to the beginning of the output ramp from ramp generator 110, the input signal to inverter U5d is low and, hence, the output signal of inverter U5e is also low. This causes transistor Q8 to be non-conductive and, hence, no signal is supplied to the run relay. When the ramp reaches its maximum value the magnitude of the input signal to inverter U5d switches from low to high to also generate a high at the output of inverter U5e. Now transistor Q8 is switched into conduction and thereby provides a signal to the run relay. It will be further noted that the output of inverter U5e connects through a diode CR8 to the emitter of transistor Q6. So long as the output of inverter U5e remains low, a ground path is provided for transistor Q6 through the output of inverter U5e. However, when the output of inverter U5e becomes high at termination of the voltage ramp, then further conduction of transistor Q6 is immediately prevented due to the sudden rapid rise in emitter voltage. It is this signal which terminates conduction of transistor Q6 and, hence, holds the voltage ramp at maximum potential.

Motor current sensing circuit 116 is shown at the left-hand portion of FIG. 12A. Circuit 116 develops at terminal Z a signal whose magnitude is proportional to the magnitude of the largest current flowing in any of the three phase lines to the compressor motor. In a balanced system, the line currents will be essentially equal in magnitude, and a motor overload will be indicated by excessive currents in all three lines. However, a phase unbalance can occasion an excessive current in only one line. With the present both of these abnormal conditions will be detected. Therefore, the three motor current transformers TRA, TRB and TRC are each operatively coupled with a corresponding one of the three-phase power lines to provide a corresponding A.C. signal as in input to an associated input transformer T1, T2 and T3. Specifically, input transformer T1, is coupled with the phase C motor current transformer TRC; transformer T2 with transformer TRB; and transformer T3 with transformer TRA. Desirably, transformers T1, T2 an T3 are designed in accordance with known techniques to provide an output voltage as a function of input current. The secondaries of transformers T1, T2 and T3 are shunted respectively by resistors R5, R6 and R7 and are thence coupled through rectifying diodes CR2 thru CR7 to one side of a resistor R29. The other side of resistor R29 is connected to a pair of parallel capacitors C1 an C9. With this construction, the voltage developed across capacitors C1 and C9 is proportional to the largest phase current flowing to compressor motor 204, terminal Z being at the junction of these two capacitors and resistor R29.

The overload protector portion includes a NOR gate U6a functioning as run overload detector 120 and a NOR gate U6b functioning as start overload detector 122. A resistive network composed of a resistor R8, an overload adjust potentiometer P2, and resistors R32, R10 and R12 is connected as shown between motor current sensing circuit 116 and the two overload detectors 120, 122. This resistive network serves to establish the respective run and start overload reference signals. A fraction of the motor current signal appearing at terminal Z is supplied via the wiper of potentiometer P2 across both resistors R10 and R12. The full magnitude of this fraction is supplied through a resistor R9 to an inverter U1c; however, because of the voltage dividing effect of resistrs R10, R12, a lesser percentage is supplied through a resistor R11 to the input of another inverter U1d. The values of resistors R10 and R12 establish the respective run and start overload reference signal levels. In the illustrated embodiment resistors R10 and R12 are selected in a ratio of approximately nine to eleven respectively so that the signals applied to inverters U1c and U1d respectively are in the ratio of 200% to 110% respectively. By appropriate factory setting of resistor R32,, the motor current signal appearing at terminal Z is attenuated to scale the respective signals applied to inverters U1c and U1d in relation to the current rating of the compressor motor used in a given application. Since potentiometer P2 permits convenient field adjustment of the magnitudes of the signals supplied to inverters U1c, U1d, the circuit may be readily tuned in to the desired start and run reference levels. In the present embodiment the scaling of resistor R32 and potentiometer P2 is such that the input to inverter U1c remains low so long as the motor current drawn by the compressor motor does not exceed 110% of rated full-load current. Similarly, inverter U1d provides a high output signals so long as the motor current does not exceed 200% rated full-load current. However, should the motor current exceed the 110% full-load level, the output of inverter U1c switches from high to low and if the current exceeds the 200% level, the output of inverter U1d also switches from high to low. The output of inverter U1c is connected to one terminal of NOR gate U6a while the output of inverter U1b is connected to one input of NOR gate U6b. The outputs of these two NOR gates are connected to the inputs of a thir NOR gate U6d. Upon detection of an overload condition by either overload detector, the normally high output of inverter U6d switches from high to low.

The circuit also provides a feature whereby an overload is indicated in the event that one of the connections from potentiometer P2 and resistor R32 is broken. This feature is provided by the connection of a resistor R8 and a solid state break down device Q1 between terminal Z and resistor R9. In the event that one of the connections opens for any reason while the compressor motor is running, a sufficient potential is developed across Q1 to permit current flow through resistor R8. device Q1 and resistors R10 and R12. The relative proportions of these three resistors and the breakdown potential of Q1 are such that signals indicative of an overload are supplied to inverters U1c, U1d.

As mentioned earlier, overload detection circuits 120 and 122 are coupled with timer circuit 124 whereby the start overload detector detects overloads exceeding a given level during motor starting and the run overload detector detects overloads of a different level during normal running of the motor. Timer circuit 124 comprises a counter U2 whose count input terminal is connected through a pulse shaping circuit to the secondary of transformer 316 via the terminal designated S25. This pulse shaping circuit comprises resistors R3, R4, a diode CR1 and inverters U1a, U1b connected as illustrated. The circuit operates to produce pulses at the count terminal of counter U2 at a rate equal to the frequency of the A.C. supply line (60 pulses per second as in the present embodiment). One output of counter U2 is connected in circuit to provide the start signal at terminal U2' after 16 pulses have been counted. Other outputs of counter U2 are coupled through a NAND gate U3a and an inverter U5a to provide at the output of the latter the run signal after 3,328 pulses have been counted. Hence, the start signal is given 16/60 second after counter U2 begins to count and the run signal is given approximately 55 seconds later. The start signal serves to set a start flip-flop composed of cross-coupled NOR gates U7a, U7b while the run signal serves to set a run flip-flop composed of cross coupled NOR gates U4c, U4d. The former flip-flop, in turn, serves to gate start overload detector 120. Hence, neither overload detector is gated during the first 16/60 or a second during which counter U2 counts; start overload detector is gated during the next approximately 55 seconds; and thereafter run overload detector 120 is gated.

A transient suppression circuit consisting of a NOR gate U6d, a resistor R14, and a capacitor C11 is connected as illustrated with the output of inverter U6c. This circuit permits an output signal indicative of an overload condition to be supplied from the overload detectors to the overload detection latch circuit 126 only if an overload detection signal is given by either overload detector for a predetermined minimum time. For example, this may be on the order of milliseconds and serves the purpose of avoiding the generation of a spurious overload signal to latch 126 which might be occasioned by certain transients rather than true overload conditions. However, the delay is sufficiently short to avoid damage to the system if a true overload condition exists. Overload detection latch 126 consists of a pair of cross-coupled NOR gates U7c, U7d connected as a flip-flop and the output thereof is supplied to oscillator 128. When the signal from capacitor C11 goes high, the output from latch 126 also goes high thereby starting oscillator 128 and, in turn, shutting down the compressor motor.

A reset circuit is provided for the overload protector circuitry. The reset circuit serves to reset the system each time the compressor motor is re-started. The reset circuit includes a resistor R15 and a capacitor C8 connected as illustrated across the output of motor sensing circuit 116 to provide a signal to an inverter U1f. An inverter U1e and a resistor R13 connect in a feedback loop between the output and input of inverter U1f to provide switching hysteresis. With this arrangement, the signal at the output of inverter U1f switches from high to low when motor current is being drawn by the compressor motor, the circuit being constructed to respond to a relatively small amount of motor current. The output of inverter U1f is connected via a reset line to the reset terminal of the overload detection latch flip-flop 126 as well as the reset terminals of the start and run flip-flops. Also, the output of inverter U1f is supplied to one input of a NOR gate U4b whose output is coupled through a NOR gate U4a to the reset terminal of counter U2.

When the output of inverter U1f switches from high to low upon starting of the compressor motor, the reset signal is given via the reset line to reset latch flip-flop 126 as well as the start and run flip-flops. With these flip-flops reset, oscillator 128 is shut off and neither the start nor run signal is given to the overload detector. The reset signal also removes the counter reset signal at the reset terminal of counter U2 thereby permitting timer circuit 124 to begin counting. When the start signal is given at terminal U2', the start flip-flop is switched from the reset to the set condition thereby providing the start signal to start overload detector 122. When the run signal is given at the output of inverter U5a, the run flip-flop is switched from a reset to a set condition thereby providing the run signal to run overload detector 120. Also, the setting of the run flip-flop supplies a signal via NOR gates U4a, U4b to shut down counter U2.

When an overload signal causes overload detection latch circuit 126 to switch from its reset to its set condition, the signal supplied to oscillator 128 goes high. Oscillator 128 comprises a circuit composed of resistors R16, R17, R18, R19, a capacitor C2, a transistor Q3, NAND gates U3c, U3d and a transformer T4 connected as illustrated. When oscillator 128 is turned on by latch flip-flop 126, pulses are generated in the secondary of transformer T4. The secondary of transformer T4 is connected with a solid state switch 130 which takes the form of a triac Q2. Normally, triac Q2 is non-conductive but when pulses are supplied via transformer T4, the triac switches into conduction to complete a circuit through the shunt of breaker 8CB. The completion of this circuit trips the breaker thereby causing the circuit between transformers 314 and 316 to open. In turn, this removes the power to ramp generator 110 and the trigger circuits so that the SCR's in the three-phase supply line to the motor can no longer conduct. Therefore, the compressor motor is effectively disconnected from the line.

DETAILED DESCRIPTION OF VOLTAGE SAFETY MODULE 238

A detailed electronic schematic diagram of the circuits contained within voltage safety module 238 is shown in FIGS. 13A, 13B and 13C. FIG. 13A illustrates unbalanced voltage detector 142; FIG. 13B, undervoltage detector 144, time delay circuit 148 and output circuit 150; and FIG. 13C, phase reversal detector 146.

Unbalanced voltage detector 142 guards the compressor motor against a potentially damaging unbalanced voltage condition. The unbalanced voltage condition may arise either directly in the three-phase supply line consisting of phases A, B and C, or else by failure of one or more of the SCR's which conduct current from the supply to the motor. In order to monitor for such an unbalanced voltage condition, (as well as for undervoltage and phase reversal hereinafter), the input connections for unbalanced voltage detector 42, as shown in FIG. 13A, are taken at the line and load sides of the three pairs of SCR's. The phase A line, which connects to the line side of the first set of SCR's 282, is supplied through a fuse 25FU, located in box 226, to one terminal of the primary of a stepdown transformer TR10. The load side of one of the other two sets of SCR's, in the present example the second set 284, is coupled through a fuse 19FU to the other primary input terminal of transformer TR10. In like fashion the line side (Phase B) of the second set of SCR's 284 connects through a fuse 20FU to one primary terminal of a second transformer TR11 with the load side of the third set of SCR's 286 connecting through a fuse 28FU to the other primary terminal of transformer TR11. Likewise, the line side (Phase C) of the third set of SCR's 286 connects through a fuse 27FU to one primary input terminal of a transformer TR12, and the load side of the first set of SCR's 282 through a fuse 26FU to the other primary terminal of transformer TR12. The three transformers TR10, TR11 and TR12 are identical and identical circuitry is associated with the secondary of each. Each of these circuits is basically a half wave rectifier with an output voltage divider. This much of the circuitry constitutes the block 140 in FIG. 11. Considering the circuitry associated with transformer TR10, the secondary thereof is connected to a capacitor BR10A through a rectifier BR10B. An output voltage divider consisting of four resistors connects across capacitor BR10A. At the two junctions of the voltage divider designated PA1 and PA2, there will be generated respective DC potentials whose magnitudes are representative of the input signal supplied to the primary of transformer TR10. With the illustrated circuit the potential at point PA1 will be slightly more positive than that at point PA2. In like manner, the potentials developed at points PB1 and PB2 will be DC potentials representative of the magnitude of the input signal at the primary of transformer TR11 and the potentials at points PC1 and PC2 representative of the magnitude of the input signal at the primary of transformer TR12. The potential at PB1 will be slightly more positive than that at PB2 and likewise for PC1 relative to PC2.

A series of six electronic comparator circuits COM1, COM2, COM3, COM4 and COM5 and COM6 monitor the voltages at the points PA1, PA2, PB1, PB2, PC1 and PC2. The comparators monitor these voltages by being connected in circuit in the following manner. The point PA1 connects through a resistor to the non-inverting input terminals of comparators COM3 and COM5; the point PA2 connects through a resistor to the inverting input terminals of comparators COM1 and COM2. The point PB1 is connected through a resistor to the non-inverting input terminals of comparators COM1 and COM6; point PB2 through a resistor to the inverting input terminals of comparators COM3 and COM4. The point PC1 is connected through a resistor to the non-inverting input terminals of comparators COM4 and COM2; point PC2 through a resistor to the inverting input terminals of comparators COM5 and COM6. The outputs of the six comparator circuits are connected in common through a pull-up resistor RES1 to a positive DC potential $+V_{DD}$ which is derived from an AC to DC converter circuit which converts the alternating control voltage from transformer 314 into an appropriate DC level. Also, resistors RES2, RES3 and RES4 are provided, as shown, for imparting hysteresis to the switching characteristic of the comparator circuits. The common output of the comparators connects to a photodiode driver circuit 400 and to time delay circuit 148.

Circuit 400 drives a photodiode 402 which is located on the terminal strip of module 238 to be externally visible when the front cover of box 228 is removed. Time delay circuit 148 drives a photodiode 458 which is photocoupled with output circuit 150. The photodiode driver circuit 400 comprises a driver stage 400a and a latch stage 400b. Driver stage 400a comprises a PNP transistor 4001 having its emitter connected to the $+V_{DD}$ supply and its collector connected through a resistor 4002 to the anode of photodiode 402, the cathode of photodiode 402 being grounded. An input voltage divider comprising resistors 4003 and 4004 connects the common output of the six comparators COM1-COM6 with the base of transistor 4001. So long as a balanced voltage condition exists, the output signal at the common output of the six comparators is of sufficiently high potential that transistor 4001 is not conductive. However, when an unbalanced voltage condition occurs, the potential becomes less positive and causes enough base current in transistor 4001 so that the same can conduct enough energizing current to photodiode 402 so that the latter illuminates. The latch circuit 400b comprises a comparator 4005, a capacitor 4006 and five resistors 4007, 4008, 4009, 4010 and 4011 connected as illustrated. The resistors 4008, 4009, and 4010 provide a reference signal to the non-inverting input of comparator 4005 while the resistor 4011 and the capacitor 4006 couple the collector of transistor 4001 to the inverting input of comparator 4005. The resistor 4007 provides switching hysteresis for the comparator and the output of the comparator is coupled in common with the output of comparators COM1-COM6. So long as a balanced voltage condition exists, the output of comparator 4005, like that of comparators COM1-COM6, presents a high impedance to ground. Upon occurrence of an unbalanced voltage condition leading to the energization of photodiode 402, the rise in the potential at the collector of transistor 4001 charges capacitor 4006 thorugh resistor 4011 to a point where the signal at the inverting input of comparator 4005 becomes sufficiently positive to cause the comparator output to switch to a low impedance path to ground. Because of latch circuit 400b, a return to a balanced voltage condition does not result in de-energization of photodiode 402. This is because latch circuit 400b continues to provide through the output of comparator 4005 a low impedance path to ground maintaining transistor 4001 conductive even though comparators COM1-COM6 will present high impedance paths to ground upon resumption of a balanced voltage condition. The only way by which the photodiode can be de-energized is by resetting the system, a procedure to be explained in greater detail later.

By way of example a 2% voltage unbalance may be chosen to cause shutdown. The circuit is designed such that for a balanced voltage condition the potentials at points PA1, PB1, and PC1 are identical. The potentials at points PA2, PB2 and PC2 are also identical, but slightly less positive than at points PA1, PB1 and PC1. This ensures that, for a balanced voltage condition, the comparators are always providing a high impedance to ground. When a voltage unbalance occurs, the potential at one of the lower reference potential points (i.e. either at PA2, PB2, or PC2) will be more positive than the higher reference potential at one or both of the other two circuits. In turn this causes the corresponding comparator(s) to switch state so that a fault signal is given to illuminate photodiode 402 and shutdown the compressor motor.

The signal from the common outputs of comparators COM1-COM6 is also supplied to one input of a NAND logic gate 450 in time delay circuit 148. Time delay circuit 148 further includes a comparator 452, a diode 454, a capacitor 456, a photodiode 458 and a number of resistors 460, 462, 464, 466, 468 and 470. These circuit elements are connected as illustrated in the drawing. Under a normal operating condition wherein no voltage fault exists, capacitor 456 cannot be charged because gate 450 (which gives a ground signal at its output under such condition) maintains through diode 454 and resistor 460 a discharge path. The voltage dividing effect of resistors 464, 466 supplies through resistor 468 to the inverting input of comparator 452 a reference potential which is a fraction of the voltage $+V_{DD}$. Under this condition the output of comparator 452 yields a high impedance path to ground which prevents photodiode 458 (which is connected in the output of the comparator) from being energized. When a signal indicative of an unbalanced voltage condition occurs, the output signal from gate 450 switches to a high potential thereby permitting capacitor 456 to charge through resistor 462. As capacitor 456 charges, the potential at the non-inverting input of the comparator becomes increasingly positive. Upon capacitor 456 attaining a certain charge, the comparator output switches to a low impedance path to ground which immediately energizes photodiode 458. The delay imposed by the charging time required to charge capacitor 456 delays slightly the disconnection of the compressor motor from the time after the occurrence of the fault so that spurious transient line faults (which would not damage the motor) do not result in motor shutdown. However, the delay is sufficiently short that the motor is disconnected if a line fault exists. Once the fault condition has been corrected, the output signal of gate 450 returns to ground potential, causing capacitor 456 to rapidly discharge, and hence de-energization of photodiode 458.

Output circuit 150 is shown in detail in FIG. 13B. Circuit 150 contains a phototransistor 436 which is photocoupled with photodiode 458. Normally, phototransistor 436 is nonconductive. However, energization of photodiode 458 will render phototransistor 436 conductive. The signal developed by phototransistor 436 is utilized to actuate breaker 7CB in the relay control circuitry. Phototransistor 436 has its collector connected through a resistor and is across the output of a full wave diode bridge BR13. An NPN transistor 438 has its base connected to the collector of phototransistor 436 and the collector thereof connected through a resistor 439 and is across the diode bridge BR13. Also connected across the diode bridge is the series combination of an SCR 442 and a diode 444. A resistor 440 connects from the cathode of the diode to the gate of the SCR. So long as the phototransistor 436 is nonconductive, the voltage potential delivered from the electromechanical relay circuitry via bridge BR13 provides a small energizing current for transistor 438 which renders this transistor conductive. However, resistor 439 is of sufficiently large magnitude to limit current drawn through the shunt trip breaker 7CB to a level well below that which will trip the breaker. When phototransistor 436 is switched into conduction, transistor 438 suddenly switches into nonconduction. When this occurs, the potential at the junction of the voltage divider resistors 439 and 440 provides a triggering voltage across the gate-cathode of SCR 442 which switches the SCR into conduction. With SCR 442 conducting, a low impedance current path is provided from terminal 446 of bridge BR13 through SCR 442 and diode 444 back to terminal 448 which will cause the breaker 7CB to trip. When the breaker trips, the three-phase line is disconnected from the compressor motor.

Undervoltage detector 144 in FIG. 13B comprises three comparators COM7, COM8 and COM9 which monitor the respective voltages developed at PA1, PB1, and PC1. The undervoltage detector develops an output signal which causes the compressor motor to shut down upon occurrence of an undervoltage condition. The undervoltage detector is interlocked with run relay 4R so that the undervoltage detector circuitry can monitor for undervoltage conditions only after the compressor motor has been accelerated to full running speed. In this way the customary drop in line voltage during starting of the motor will not cause the undervoltage detector circuit to give a shut down signal during starting. The DC reference potential + $V_{DD}$ is coupled through contact 4Rb and a resistor RES5 to energize a zener diode Z10. The circuit parameters are chosen so that zener diode Z10 provides a constant zener reference voltage even though appreciable drops in the supply voltage may occur. The reference voltage of the zener diode provides a signal to the inverting input terminal of each of the three comparators COM7, COM8 and COM9, which signal is unaffected when the line voltage of any of the phases drops below a predetermined magnitude indicative of an undesired undervoltage condition. Capacitors are connected in shunt with the zener diode for maintaining this reference potential for an adequate period of time during extreme drops in line voltage. The noninverting input terminal of each comparator is coupled through a corresponding resistor to points PA1, PB1, and PC1, respectively. The outputs of the three comparators are coupled in common through a pull-up resistor to the + $V_{DD}$ supply, and resistors are provided in association with each comparator for switching hysteresis. Normally, so long as the magnitude of each of the phase voltages remains above the predetermined magnitude, the comparators present a high impedance path to ground and the potential at the common outputs remains high. Should the voltage magnitude of any of the three phases drop below the predetermined minimum, then the appropriate comparator will switch to provide a low impedance to ground, causing energization of a photodiode 406 via a driver circuit 404. Photodiode 406 is mounted on the module, and the driver circuit is exactly like driver circuit 400 including latch. The common output of the comparators is fed to another input of gate 450 which actuates circuits 148 and 150 in the same manner as described above.

Phase reversal detector 146, shown in FIG. 13C, operates to disconnect the compressor motor from the line should the phase sequence be reversed from a correct sequence. The circuit comprises a set of three waves shaping circuits 408, 410 and 412 which are associated respectively with the secondaries of transformers TR10, TR11 and TR12. Each circuit 408, 410 and 412 comprises a half wave rectifying diode and a transistor stage whereby a square wave is developed at the collector of each transistor. The circuit further includes a set of three inverting amplifiers 414, 416 and 418 and a series of three logic AND gates 420, 422 and 424. The input of each inverting amplifier 414, 416 and 418 connects respectively to the collector of the transistor of the corresponding wave shaping circuit 408, 410 and 412 and the outputs of the inverting amplifiers are connected with the logic gates in the following fashion. The output of inverting amplifier 414 connects to the gates 420 and 424, the output of amplifier 416 to gates 420 and 422 and the output of amplifier 418 to gates 422 and 424. The signal waveform at each output of the inverters 414, 416, and 418 is representative of a corresponding one of the three line phases as indicated by the waveforms at the left of FIG. 13C. The remainder of circuit 146 comprises a pair of D-C type flip-flops 426, 428, a jumper wire 430 and a photodiode driven circuit 432. The two flip-flops 426 and 428 are electrically connected in circuit as illustrated. In order to make the circuit responsive to the phase sequence of the three phases, two of the AND gates are connected respectively to the S and R inputs of flip-flop 428 while the remaining AND gate output is connected to the clock input of flip-flop 426. In the illustrated arrangement the output of gate 420 connects to the R input of flip-flop 428 while the output of gate 424 connects to the S input of the same flip-flop. The output of gate 422 connects to the C (clock) input of flip-flop 426.

Assuming for the moment that the correct phase sequence is A, B, C, as shown by the waveforms in the first series in FIG. 13C, the circuit operates in the following manner. When the trailing edge of phase A occurs, an output pulse is generated by gate 420 to apply a signal to the R terminal of flip-flop 428. This causes a logical zero to be present at the Q output of the flip-flop. Upon occurrence of the trailing edge of the B phase waveform, flip-flop 426 is clocked. Because the Q output of flip-flop 428 connects to the D input of flip-flop 426, the clocking of the latter flip-flop causes a logical zero to be clocked to the Q input of flip-flop 426 and a logical one to the clocked to the $\overline{Q}$ output. Upon the occurrence of the trailing edge of the phase C waveform, gate 424 sets flip-flop 428 so that the Q output thereof switches to a logical one. However, since the next phase will be phase A, flip-flop 428 is reset to switch the Q output of flip-flop 428 back from a logical one to a logical zero. Now when the phase B waveform again clocks flip-flop 428, the Q output thereof remains at zero and the $\overline{Q}$ thereof remains at one. This sequence ensues so long as the phase sequence is A, B, C. Thus the $\overline{Q}$ output always provides a logical one signal via jumper wire 430 to photodiode driver 432. Photodiode driver 432 is the same as the preceding photodiode drivers (less latching circuit) and thus so long as the signal applied thereto is a logical one (i.e., a high positive potential signal), the photodiode 434 which is driven thereby remains de-energized.

In the event that the phase sequence is A, C, B, then the circuit operates to provide a signal which disconnects the line from the motor. This happens in the following fashion. Because phase C now immediately follows phase A, the Q output of flip-flop 428 will be at a logical one when flip-flop 426 is clocked by phase B. This will cause a logical one to be clocked to the Q output of flip-flop 426 and a logical zero to the $\overline{Q}$ output. When the $\overline{Q}$ output switches from a logical one to a logical zero the photodiode driver circuit 432 is immediately actuated to illuminate photodiode 434 and shut down the compressor motor via time delay circuit 148 and output circuit 150. By providing jumper wire 430 the correct phase sequence can be selected for a given installation without having to perform any rewiring of the electronics or the motor after the system is wired. The jumper wire is merely connected between the appropriate terminals on the voltage module 238. The illustrated connection as shown in the drawing is for a correct sequence A, B, C, and an incorrect sequence A, C, B, by connecting the jumper wire to the Q output of flip-flop 426 the correct sequence is A, C, B, and the incorrect sequence is A, B, C. It should be noted that the output signal from phase reversal detector 146 is supplied to gate 450 in the same manner as the output signal from the other two fault circuits to cause motor disconnection via circuits 148 and 150.

Thus, voltage safety module 238 provides important protection for the compressor motor and the complete chiller control system. With this protection, the possibility of damage to the motor is appreciably minimized and greater safety is provided to equipment and operating personnel. Moreover, the use of solid state electronic circuitry permits the entire unit to be conveniently packaged into a compact individual module and the solid state construction renders the unit highly reliable and accurate. While in the present embodiment the voltage safety module is intended for protection against both failures in the line itself and as well as in the solid state switches it will be appreciated that it could be used alone to monitor line voltage in installations where solid state switches are not employed.

DESCRIPTION OF TRIGGER CIRCUITS (TRIGGER MODULE 236)

Figure 14:
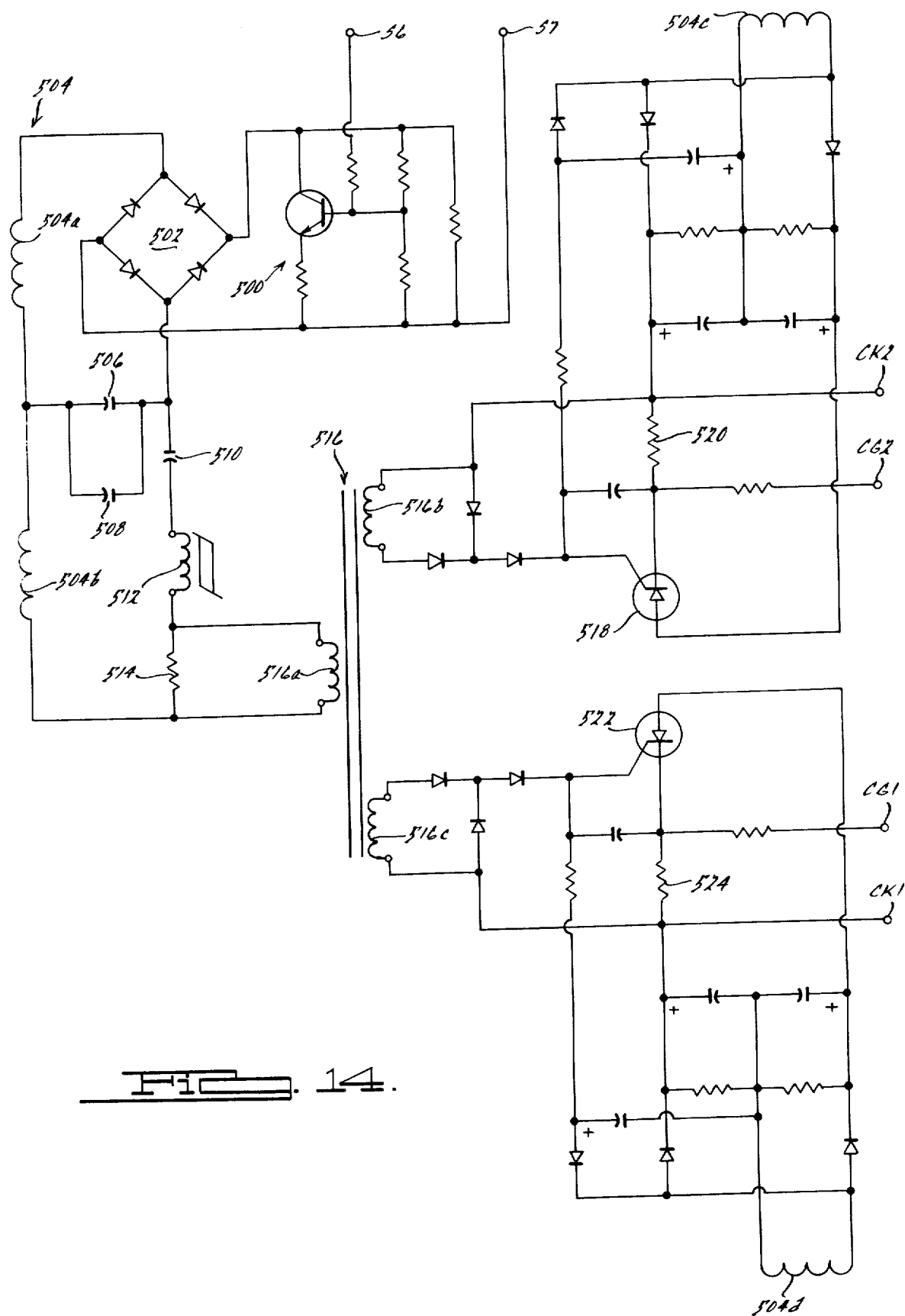
FIG. 14 is a detailed electronic schematic diagram of one of the three trigger circuits of the electronic controls.

FIG. 14 illustrates one of three identical trigger circuits contained within trigger module 236. The trigger circuit illustrated in the drawing is associated with one set of SCR's, for example, with set 286, the remaining two sets of SCR's each being associated with a corresponding one of the two trigger circuits which are not illustrated.

Briefly, each trigger circuit provides output trigger signals to the associated pair of SCR's, which signals are phased in relation to the corresponding line phase in accordance with the output ramp signal developed by ramp generator circuit 110 of current module 240. For the illustrated circuit, the signals are phased in relation to phase C. The ramp signal is applied via terminals S6, S7 to an input circuit 500. Input circuit 500 comprises an NPN transistor and a plurality of resistors connected as illustrated to receive the ramp signal in such a manner that conductivity of the NPN transistor increases as the magnitude of the ramp increases. Circuit 500 is energized through a full wave rectifying bridge 502 from a three-phase voltage transformer 504 comprising a plurality of secondary windings associated with each phase. In the drawing for the illustrated trigger circuit, secondaries 504a, 504b, 504c and 504d are associated with phase C of the three phase supply. The secondary 504a has one terminal connected to one side of the AC input to bridge 502 and its other terminal connected through a pair of parallel capacitors 506, 508 to the other side of the bridge input. The secondary winding 504b along with a capacitor 510 and an inductor 512, a resistor 514 and the primary winding 516a of a transformer 516 are also connected in circuit. Inductor 512 provides a certain voltsecond characteristic exhibiting a certain amount of hysteresis. With this arrangement a triggering pulse will be generated in primary winding 516a which is phased in relation to the phase line in proportion to the conductivity of input circuit 500 as established by the voltage ramp signal. Transformer 516 in turn causes pulses to be induced in secondaries 516b, 516c. During one half of the line phase, the pulse generated in secondary 516b will cause SCR 518 to switch into conduction and develop a trigger pulse across resistor 520 which is delivered via terminals CG2 and CK2 to SCR2C causing that SCR to fire. Likewise, during the opposite half cycle of the line phase, the pulse induced in secondary 516c causes SCR 522 to fire and a trigger pulse to be developed across resistor 524 which is delivered via terminals CG1 and CK1 to SCR1C thereby firing this SCR. It will thus be appreciated that the phase angle at which each trigger pulse is delivered to the corresponding SCR is dependent upon the magnitude of the voltage applied to terminals S6 and S7. By applying a ramp signal to these terminals the voltage phase angle at which the SCR's are triggered to conduct current to the compressor motor is controllably advanced from a selected minimum firing angle thereby efficiently accelerating the motor to running speed at which time essentially full conduction of the SCR's occurs. It will be appreciated that the illustrated triggering circuit is merely exemplary and that other triggering circuits may be utilized if desired. Examples of these are shown in various texts such in the General Electric "SCR Manual". The values of circuit components may be selected in accordance with known electronic design standards to provide the correct phasing.

DESCRIPTION OF FIGS. 15A, AND 15B

Figure 15A:
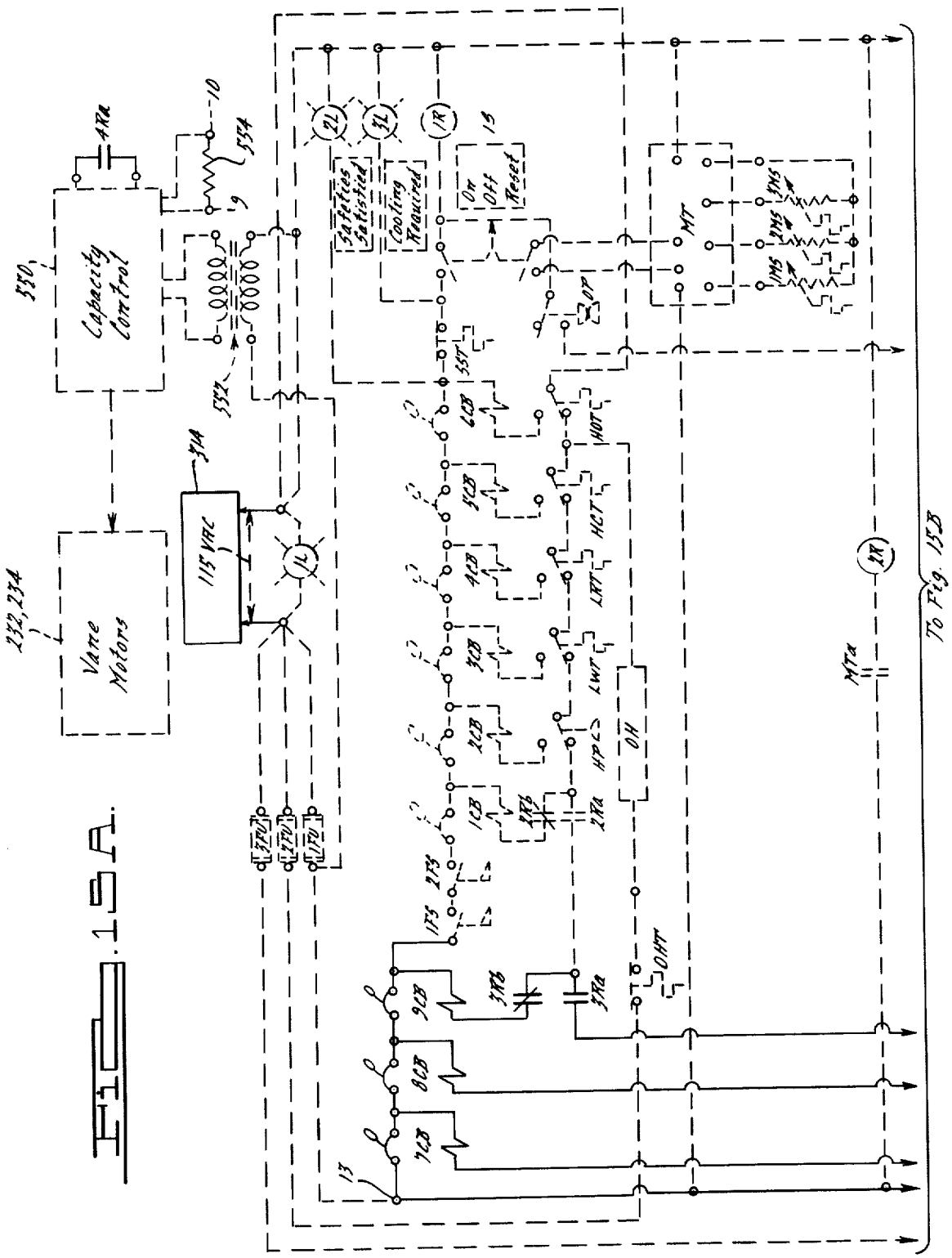
FIGS. 15A and 15B should be considered together and constitute an electrical schematic diagram of the electromechanical portion of the controls.
Figure 15B:
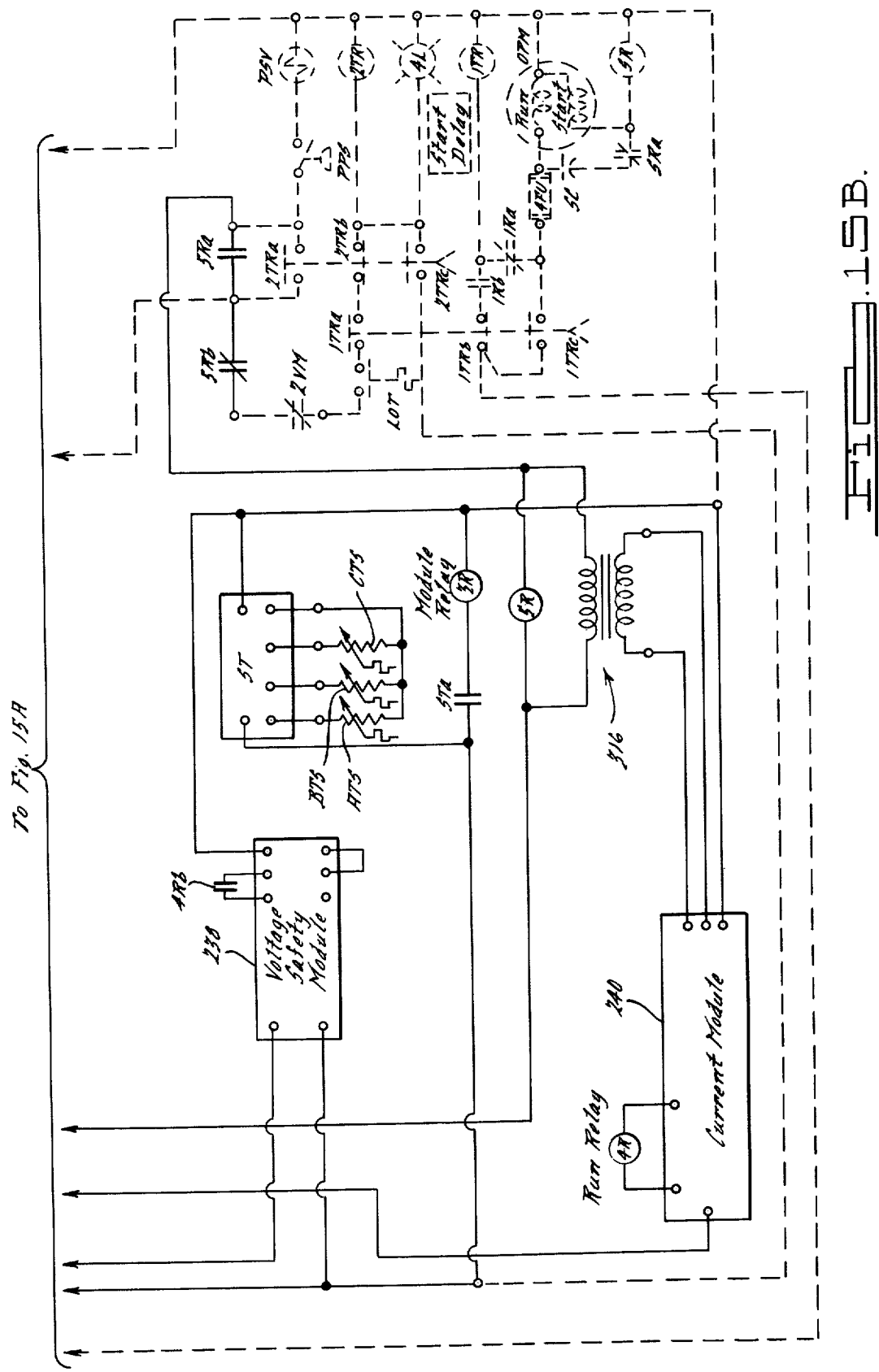

FIGS. 15A and 15B together constitute an electrical schematic wiring diagram of the electromechanical portion of the controls and illustrate how current control module 240, voltage safety module 238, and the starter temperature safety module ST are operatively associated with the electromechanical relay control circuitry. In FIGS. 15A and 15B the portions shown in broken lines are located exteriorly of motor control panel 228 while the portions shown in solid lines are located within motor control panel 228. For the most part, the broken line components are located in the unit control panel 230 (FIG. 1). Power for the circuitry is supplied from the transformer 314 in control connection box 224.

Considering FIG. 15A, a capacity control 550 is a conventional device utilized to control the compressor vane motors 232, 234. The capacity control unit is powered from a transformer 552 and is interlocked with the relay control via a relay contact 4Ra of relay 4R; a signal indicative of motor current load developed across a resistor 554 is also supplied to the unit. The circuitry in motor control box 228 is mainly fused from a fuse 1FU in panel 230. The circuitry located in unit control panel 230 is fused via a self-contained fuse 3FU. A separately fused circuit off fuse 2FU is for the oil heater OH. FIGS. 15A and 15B are illustrated in the following conditions: power off, system pressure equalized, safeties not tripped, full cooling required by system thermostat, timers at beginning of start cycle and deenergized, and ambient temperature above 55° F.

Considering the circuitry in detail, the main control is via a run relay 1R in FIG. 15A. Relay 1R is coupled across the line through a main control switch 1S, a start-stop thermostat SST, and a safety circuit composed of circuit breakers 1CB through 9CB and condenser and chilled water flow switches 1FS and 2FS. Each circuit breaker comprises a normally-closed manually resettable magnetic switching element and an electric coil element arranged to actuate the switching element when energized. The switching elements of the circuit breakers are connected in a series string along with the flow switches, the startstop thermostat and a contact of the main switch 1S so that the string controls the energization of relay 1R. Relay 1R is energized only when all the switching contacts in the string are closed. If any one of the contacts opens, relay 1R drops out. The construction of each circuit breaker is such that essentially the full line voltage is intended to be applied across the coil element thereof to cause the corresponding magnetic switching element to immediately open. Accordingly, each coil element of each circuit breaker must be connected through some type of switching device to the other side of the line. Thus, each circuit breaker is designated a shunt-trip device. One particular advantage is that the breakers may be made more compact and at less cost thereby saving both space and expense. For circuit breaker 7CB the coil element thereof connects to current module 240 so that when a current overload condition occurs, breaker 7 CB is tripped. The coil element of circuit breaker 8CB connects to voltage safety module 238 so that when a voltage fault occurs, breaker 8CB is tripped. The remaining circuit breakers 1CB through 6CB and 9CB are associated, as shown in the drawing, each with a normally closed and a normally open set of switch contacts. Each set of normally open and normally closed contacts is associated with a movable member whereby both contacts are actuated simultaneously, i.e., a double pole, single throw switch configuration. Thus, circuit breaker 9CB is coupled with the normally closed contacts 3Rb and the normally open contacts 3Ra of relay 3R. Circuit breaker 1CB is coupled with the normally closed relay contacts 2R*b* and the normally open contacts 2R*a* of relay 2R. Relay 2R is under the control of the motor temperature safety device MT. Circuit breaker 2CB is coupled with a high pressure switch HP monitoring line pressure; circuit breaker 3CB, with a low water temperature switch LWT in the chilled water line; circuit breaker 4CB, with a low refrigerant temperature switch LRT in the refrigerant line; circuit breaker 5CB, with high compressor temperature switch HCT in the compressor and circuit breaker 6CB with a high oil temperature switch HOT associated with the oil heater. The illustrated conditions of the switches HP, LWT, LRT, HGT and HOT are for a normal operating condition. When the chiller is running normally, relays 2R and 3R are energized and thus contacts 3R*a* and 2R*a* are closed while contacts 3R*b* and 2R*b* are open. Thus, in normal operation of the chiller, the contacts 3R*a*, 2R*a* and the normally closed contacts of switches HP, LWT, LRT, HCT and HOT form a complete circuit from one side of transformer 316 to the return side of the line. If one of the monitored conditions indicates that it is unsafe, the unassociated circuit breaker will be actuated via the corresponding sets of contacts. For example, if there is too low refrigerant temperature, switch LRT is actuated. This completes a circuit to one side of the line through switches LRT, HCT and HOT; and to the other side of the line through the switching elements of circuit breakers 1CB, 2CB, 3CB, 4CB, 7CB, 8CB and 9CB and through flow switches 1FS, 2FS. Energization of the circuit breaker coil element causes the magnetic switching element thereof to open thereby breaking the string to de-energize relay 1R. In addition to providing a compact construction for each of the individual circuit breakers, wiring complexity is significantly reduced. Once actuated, a breaker can be reset only manually.

The start-stop thermostat SST opens to de-energize relay R1 if the cooling demand ceases. The oil heater OH is thermostatically controlled by the oil heating thermostat OHT, and this circuit is fed through the normally closed contacts of the hot oil temperature switch HOT. The main control switch 1S comprises two sets of contacts, one of which is a momentary contact which is actuated when the switch is operated to the reset position. Actuation of this one set resets the motor temperature safety module MT. When the switch is turned to the on position to operate the chiller, the other set closes so that relay 1R is energized. The motor temperature safety module MT is a conventional device manufactured by Robertshaw Controls as model No. MP 23. The device comprises a number of resistance wire sensors 1MS, 2MS, 3MS located in the motor to sense the temperature of the motor windings. Should the winding temperature become excessive, the device MT closes an associated switch MT*a* which de-energizes relay 2R. The contacts of relay 2R are associated with circuit breaker 1CB as indicated above.

In FIG. 15B the starter box temperature safety module ST is identical to the module MT described above. Operatively associated with the module ST are the three sensing elements ATS, BTS and CTS which are located in the three SCR mounting arrangements 282, 284 and 186 as can be seen in FIG. 4. The module ST is energized from the line and so long as the sensed temperature at the SCR clusters remains below a predetermined safe level, the associated switch contacts ST*a* remain closed to hold relay R3 energized. Whenever an excessive temperature occurs, as sensed by any one of the sensors ATS, BTS, CTS, contacts ST*a* opens to thereby deenergize relay 3R.

The remainder of FIG. 15B comprises several electromechanical circuits. The major elements of these are a pair of timers 1TR, 2TR which control the time sequence of several points of operation of the overall system. Timer 1TR controls three sets of timed contacts, 1TR*a*, 1TR*b*, and 1TR*c*, and timer 2TR controls three sets of timed contacts 2TR*a*, 2TR*b*, and 2TR*c*. The two timers and the related circuits are so constructed in the preferred example that contacts 1TR*a* close 30 seconds after energization of relay 1R, and open 26 seconds after the de-energization thereof; contacts 1TR*b* open 50 seconds after energization of relay 1R, and close 12 seconds after deenergization thereof; and contacts 1TR*c* close 10 seconds after energization of relay 1R and open 430 seconds after de-energization thereof. Timer 2TR and the related circuitry are so arranged and constructed that contacts 2TR*a* close 210 seconds after energization of relay 1R, and open 270 seconds after energization thereof; contacts 2TR*b* open 140 seconds after energization of relay 1R, and close 29 minutes, 35 seconds after energization thereof, and contacts 2TR*c* close 93 seconds after energization or relay 1R, and open 30 minutes and 30 seconds after energization thereof. There is also included in this portion of the control circuitry a purge solenoid valve PSV which is fed through contacts 2TR*a* and a purge pressure switch PPS. A lube pump motor OPM with the usual starting circuit is fed through contacts 1TR*c*. Timer 1TR is itself fed through contacts 1TR*b* and contacts 1R*b* controlled by relay 1R. The normally closed contact 1R*a* is also connected in this circuit as illustrated. Timer 2TR is in parallel with a start delay lamp 4L. These are fed through two separate feeds, one of which is contacts 2TR*c* and the other of which is a string of contacts including 2TR*b*, 1TR*a*, a low oil temperature switch LOT, a vane motor switch 2VM and normally closed contacts 5R*b* or relay 5R. Relay coil 5R shunts primary transformer 316 and also controls a second set of contacts 5R*a* shunting contacts 2TR*a*. With this construction the actuation of switch 1S to the on position causes the oil pump motor to provide a pre-lube of approximately 210 seconds and a post-lube of apprximately 430 seconds. The timer 2TR limits the number of compressor starts to one start every 30 minutes, regardless of the reason which occasioned the shut down of the compressor.

DESCRIPTION OF FIGS. 16A AND 16B

FIGS. 16A and 16B illustrate a wiring diagram for the chiller controls according to the present invention. The wires are designated according to the usual convention wherein common wires are identified at each termination by like reference numerals. For example, wire number 2 connects from one terminal of the secondary of transformer 313 to terminal board 315, and also to unit control panel 230, to safety unit ST, to relay 3R, to voltage safety module 238 and to current module 240.

FIGS. 16A and 16B illustrate several devices which are not shown in detail in the preceding figures. For example, the suppression networks associated with the gate-cathode triggering circuits of each of the SCR's are illustrated. These suppression networks are shown as parallel resistance and capacitance between the gate and cathode of each SCR and these are physically mounted within control connection box 224. Preferably the wiring associated with the gate-cathode circuits of the SCR's comprises shielded conductors with the shielding being grounded.

It can also be seen in FIGS. 16A and 16B that ammeters 250, 252 and 254 are connected to measure the current in each line phase A, B and C, each ammeter being associated with a corresponding one of the transformers TRA, TRB, and TRC. The resistor 554 is a low corresponding device connected in one of the ammeter circuits to provide a voltage signal to capacity control unit 500 which is representative of motor load. It can also be seen in FIG. 16A how the connections to the SCR's for the voltage safety unit are fused by means of fuses 27FU, 28FU, 20FU, 19FU, 25FU and 26FU. Also, in FIG. 16B the field adjustment module 242 is shown to provide a limited field adjustment for the starting current and a limited field adjustment for the overload current by means of potentiometers P1 and P2, respectively. These potentiometers are accessible via screw driver adjustments to provide the field adjustment. However, resistor R32 is not accessible for adjustment but rather is factory set in consideration of the given rating of the starter.

OVERALL OPERATION OF THE CONTROLS

The overall operation of the controls is as follows. In order to start the compressor, switch S1 is actuated first to reset the motor safety device (if needed) and then it is actuated to the on position. After contacts 2TRa have been actuated to the closed position by timer 2TR, transformer 316 is energized to supply power to current module 240. At the same time that transformer 316 is energized, relay 5R is also energized to close sealing contacts 5Ra and to open contacts 5Rb. The relay 5R and associated contacts provide an interlock with the timer 2TR whereby the compressor cannot be restarted until 30 minutes after any shut down. The application of power to current module 240 causes the ramp waveform to be applied to trigger module 236 for triggering the SCR's as described above so that the motor starts. When the motor has been accelerated to full running speed by the solid state starter, relay 4R is energized. This permits the undervoltage detector portion of voltage safety module 238 to monitor for undervoltage conditions. At all times, the voltage safety module monitors for unbalanced voltage and phase reversal conditions. During starting, the current module 240 monitors current overloads at a given overload level and once the motor has accelerated to running speed monitors for overloads at a lower current level.

The controls shut down the chiller in the event of any of a number of fault conditions as already enumerated. For example, a current overload, as monitored by current module 240, will trip breaker 7CB and a voltage fault as monitored by current module 240, will trip breaker 7CB and a voltage fault as monitored by voltage module 238 will trip breaker 8CB. If an excessive temperature condition is monitored at the SCR's in the starter box 222, safety module ST opens contacts STa to thereby de-energize relay module 3R. De-energization of relay 3R trips breaker 9CB. If excessive temperatures are monitored in the compressor motor windings by module MT, contacts MTa de-energize relay 2R which trips breaker 1CB via contacts 2Ra, 2Rb. Should a fault condition be monitored by any of the other safety switches, the appropriate circuit breaker is tripped to shut down the compressor motor via de-energization of relay 1R. In all instances where the compressor is shut down via de-energization of relay 1R, the mandatory 30 minute delay period for restarting is always imposed. As noted above in connection with the description of voltage safety module 238, it is necessary to reset the voltage safety module by removing power therefrom whenever a fault is given because of an undervoltage condition or an unbalanced voltage condition in order to unlatch the latching circuit associated therewith.

What is claimed is:

1. In combination:
    a chiller system for providing cooling to a medium to be cooled, said chiller system including an AC electric motor for driving a compressor;
    controlled conduction solid state switch means having a line side and a load side;
    means for coupling said line side of said solid state switch means to a source of AC electric power;
    means for coupling said load side of said solid state switch means to said AC electric motor; and
    means for accelerating said AC electric motor to running speed comprising means for controllably applying trigger signals to said solid state switch means such that the firing angle at which said solid state switch means is fired in relation to the voltage phase angle of the source of AC electric power is progressively increased from a minimum firing angle to a maximum firing angle to thereby start and accelerate the motor to running speed;
    said electric motor being of the polyphase type;
    said solid state switch means comprising a solid state switch in each of said phases;
    and voltage safety means for protecting said motor against a fault in the voltage actually applied to the motor;
    said voltage safety means comprising a transformer for each of said phases; each of said transformers having a respective primary and a secondary winding;
    each of said transformers having a primary winding connected between a line side of said switch associated with a respective phase and a load side of said switch associated with another phase;
    monitoring circuit means connected across the respective secondary windings of each of said transformers for monitoring a parameter of the voltage waveform of each of said phases, and for generating a signal when the monitored parameter exceeds a preselected value;
    and disconnect means responsive to said monitoring circuit means signal for disconnecting said motor from the source of AC electric power.

2. The combination claimed in claim 1 wherein said monitoring circuit means includes means for sensing an undervoltage condition of the source of AC electric power.

3. The combination claimed in claim 1, in which said monitoring circuit means comprises means for sensing voltage unbalance.

4. The combination of claim 1, wherein said monitoring circuit means includes voltage phase reversal sensing means.

5. The combination of claim 4, in which said voltage phase reversal sensing means comprises sequence means for producing signals representative of a preselected sequence of voltage waveforms in said phases, and detecting means responsive to said sequence signals for producing said monitoring circuit means signal when the sequence is other than at predetermined sequence.

6. The combination of claim 3, in which said means for sensing voltage unbalance comprises a reference signal generator for each of said phases for generating a first and a second reference signal, comparing means for each of said phases receiving one of said first reference signals from one of said phases at an input terminal and receiving said second reference signal from another of said phases at a second input terminal, means for connecting the output terminals of said comparing means together, said comparing means being operable to produce an unbalance signal when said reference signals vary by amount indicating a predetermined voltage unbalance in said phases, and detecting means responsive to said unbalanced signal for producing said monitoring circuit means signal.

7. The combination of claim 3, in which said detecting means comprises a latch for maintaining said monitoring circuit means signal after an unbalance signal has been generated.

8. The combination of claim 2, in which said undervoltage condition sensing means comprises a reference signal generator, and comparing means for comparing the level of signal from said secondary windings of said transformers with said reference signal and for producing said monitoring circuit means signal when said level to signal from said secondary windings of said transformers falls below a preselected value.

9. The combination of claim 8, in which said means for sensing an undervoltage condition comprises latch means for maintaining the monitoring circuit means signal after an undervoltage condition has been sensed.

10. The combination claimed in claim 1 wherein said solid state switch means is contained within an enclosure and refrigerant from the chiller system is circulated through said enclosure thereby extracting heat from said solid state switch means during operation thereof.

* * * * *